(12) United States Patent
Martinez et al.

(10) Patent No.: US 11,386,269 B2
(45) Date of Patent: Jul. 12, 2022

(54) FAULT-TOLERANT INFORMATION EXTRACTION

(71) Applicants: Université Paris-Est Marne-la-Vallée, Marne la Vallee (FR); ESIEE Paris, Chambre de commerce et d'industrie de région Paris Ile de France, Noisy-le-Grand (FR); Centre National de la Recherche Scientifique, Paris (FR); École des ponts ParisTech, Marne-la-Vallee (FR)

(72) Inventors: Cristian Martinez, Champs-sur-Marne (FR); Claude Martineau, Paris (FR); Antoine Schoen, Paris (FR); Tita Kyriacopoulou, Paris (FR)

(73) Assignees: Université Paris-Est Marne-la-Vallée, Marne la Vallee (FR); ESIEE Paris, Chambre de commerce et d'industrie de région Paris Ile de France, Noisy-le-Grand (FR); Centre National de la Recherche Scientifique, Paris (FR); École des ponts ParisTech, Marne-la-Vallee (FR)

( * ) Notice: Subject to any disclaimer, the term of this patent is extended or adjusted under 35 U.S.C. 154(b) by 17 days.

(21) Appl. No.: 16/613,072
(22) PCT Filed: May 11, 2018
(86) PCT No.: PCT/EP2018/062244
§ 371 (c)(1),
(2) Date: Nov. 12, 2019
(87) PCT Pub. No.: WO2018/206784
PCT Pub. Date: Nov. 15, 2018

(65) Prior Publication Data
US 2020/0143112 A1 May 7, 2020

(30) Foreign Application Priority Data
May 12, 2017 (EP) .................................. 17305546

(51) Int. Cl.
*G06F 40/30* (2020.01)
*G06F 40/295* (2020.01)
(Continued)

(52) U.S. Cl.
CPC .......... *G06F 40/295* (2020.01); *G06F 40/211* (2020.01); *G06F 40/253* (2020.01); *G06F 40/284* (2020.01); *G06F 40/30* (2020.01)

(58) Field of Classification Search
CPC .... G06F 40/289; G06F 40/295; G06F 40/253; G06F 40/284; G06F 40/30
See application file for complete search history.

(56) References Cited

U.S. PATENT DOCUMENTS 6,116,644 A    9/2000  Viano et al.
7,299,180 B2 * 11/2007  Wang .................... G06F 40/295
                                                      704/257

(Continued)

FOREIGN PATENT DOCUMENTS

DE      10062560 A1    7/2001
DE      10119351 A1    7/2002
(Continued)

OTHER PUBLICATIONS

Friburger, Nathalie, and Denis Maurel. "Finite-state transducer cascades to extract named entities in texts." Theoretical Computer Science 313.1 (2004): 93-104. (Year: 2004).*

(Continued)

*Primary Examiner* — Jialong He
(74) *Attorney, Agent, or Firm* — TraskBritt

(57) ABSTRACT

A computer-implemented method for automatically analyzing a natural language input for information extraction comprises (i) a step of receiving the natural language input; (ii) a step of providing a grammar model comprising: a local grammar model, a set of external functions, and a finite set (Continued)

of read/write shared memory registers used by a parsing engine and the external functions; (iii) a step of applying the grammar model to the natural language input using the parsing engine, and (iv) a step of extracting information from the natural language input using at least one new output of the grammar model, the new output of the grammar model being built based: on at least one return value of the external functions from evaluating the one or more external functions in step (iii), and one or more input labels and/or output labels.

15 Claims, 13 Drawing Sheets

(51) Int. Cl.
*G06F 40/253* (2020.01)
*G06F 40/284* (2020.01)
*G06F 40/211* (2020.01)

(56) References Cited

U.S. PATENT DOCUMENTS

| | | | |
|---|---|---|---|
| 9,934,777 B1* | 4/2018 | Joseph | G10L 15/063 |
| 10,121,467 B1* | 11/2018 | Gandhe | G06F 40/284 |
| 2006/0175813 A1 | 8/2006 | Heudorfer et al. | |
| 2008/0147278 A1 | 6/2008 | Breed | |
| 2009/0106183 A1 | 4/2009 | Estan et al. | |
| 2010/0161314 A1* | 6/2010 | Karttunen | G06F 40/289 |
| | | | 704/9 |
| 2011/0282812 A1 | 11/2011 | Chandramouli et al. | |
| 2012/0267183 A1 | 10/2012 | Wilmot et al. | |
| 2016/0188573 A1* | 6/2016 | Tang | G06F 40/284 |
| | | | 704/9 |

FOREIGN PATENT DOCUMENTS

| | | |
|---|---|---|
| EP | 3228505 B1 | 2/2019 |
| WO | 01/89885 A1 | 11/2001 |
| WO | 2003/053751 A1 | 7/2003 |
| WO | 2004/016478 A1 | 2/2004 |

OTHER PUBLICATIONS

Krstev, Cvetana, et al. "E-dictionaries and Finite-state automata for the recognition of named entities." Proceedings of the 9th International Workshop on Finite State Methods and Natural Language Processing. 2011. (Year: 2011).*
Gaio, Mauro, and Ludovic Moncla. "Extended named entity recognition using finite-state transducers: An application to place names," 2017. (Year: 2017).*
International Search Report for International Application No. PCT/FR2018/051138 dated Aug. 28, 2018, 3 pages.
International Written Opinion for International Application No. PCT/FR2018/051138 dated Aug. 28, 2018, 6 pages.
European Search Report for European Application No. 17305546.8 dated Oct. 26, 2017, 9 pages.
Kokgitsidou et al., Extraction de citations contenues dans des documents brevet, 32nd International Conference on Lexis and Grammar, Sep. 1, 2013, pp. 57-64.
Rafea et al., Lexical Analysis of Inflected Arabic Words Using Exhaustive Search of an Augmented Transition Network, Software Practice & Experience, vol. 23, No. 6, May 1, 1993, pp. 567-588.
Bates et al., The Theory and Practice of Augmented Transition Network Grammars, Advances in Biometrics: International Conference, Proceedings, (Aug. 27-29, 2007), pp. 191-254.
European Communication Pursuant to Article 94(3) for Application No. 17305546.8 dated Dec. 10, 2021, 10 pages.

* cited by examiner

FAULT-TOLERANT INFORMATION EXTRACTION

CROSS-REFERENCE TO RELATED APPLICATIONS

This application is a national phase entry under 35 U.S.C. § 371 of International Patent Application PCT/EP2018/062244, filed May 11, 2018, designating the United States of America and published as International Patent Publication WO 2018/206784 A1 on Nov. 15, 2018, which claims the benefit under Article 8 of the Patent Cooperation Treaty to European Patent Application Serial No. 17305546.8, filed May 12, 2017.

TECHNICAL FIELD

The present disclosure relates to a computer-implemented method for automatically analyzing a natural-language input for information extraction, in particular, for named-entity recognition (NER).

BACKGROUND

Information extraction is the task of automatically extracting significant textual patterns (entities) from unstructured and/or semi-structured machine-readable documents.

It is estimated that 80% of the world's data is unstructured. Regarding the data that comes in textual form, a major challenge is to efficiently identify and classify entities (sequences of characters) from a given text, so-called "named-entity recognition", i.e., the task of locating a set of concrete and well-defined elements in a text belonging to a predefined category: person-names, organizations, locations, time expressions, etc. The resulting identification and extraction has a wide range of applications, for instance, in text summarization, machine translation, knowledge extraction, record linkage, and/or sentiment analysis. A corresponding classification may also be of use in data queries.

For analyzing a natural-language input for information extraction, two main approaches are currently used.

A first approach uses rule-based or linguistic grammar-based techniques, such as regular expressions, Horn Clause Logic approaches, Link Grammars, Constraint Grammars (CG) or Local Grammars (LG).

A second approach uses statistical models, in particular, in combination with Machine Learning (ML). Many of the latter approaches make use of Hidden Markov models (HMM), Conditional Random Fields (CRM), Neural-Networks (NN) or Deep Learning (DL) techniques.

Precision and recall are the most common measures to evaluate the quality of an information extraction system. While the precision is the fraction of relevant entities found in relation to the total number of entities retrieved, the recall relates to the fraction of relevant entities found in relation to the total number of relevant entities. Grammar-based systems usually yield a higher precision than statistical approaches, since they consider the structure of the text on a sentence basis, while statistical approaches are mainly based upon building a BOW (bag-of-word) model, which only operates on a word level. Statistical approaches, however, use large amounts of annotated data for training and currently yield a higher recall than grammar-based approaches, particularly when the testing data is not short and unknown expressions or violations of standard grammatical rules occur.

BRIEF SUMMARY

The present disclosure concerns:
a computer-implemented method for automatically analyzing a natural language input for information extraction, the method comprising:
  (i) a step of receiving the natural language input;
  (ii) a step of providing a grammar model, the grammar model comprising:
    a local grammar model with a finite set of state transitions between states,
    at least one external function for information extraction, linked to the local grammar model, and
    a finite set of read/write memory locations, accessible by the at least one external function, in which are stored the natural language input, the states, one or more outputs of the grammar model, and/or other data;
  (iii) a step of applying the grammar model to at least a part of the natural language input;
at least one of the state transitions of the finite set of state transitions being defined by a current state, a following state, an input label and an output label, and wherein the external function is attached to the state transition,
the external function being an operation over: at least the part of the natural language input, one or more states, at least one output of the grammar model, and/or other data;
the external function having a read/write access to: the natural language input, the states, an output of the grammar model, and/or other data,
applying the grammar model comprising evaluating the external function attached to the at least one state transition; and the external function returning, after being called, a return value,
applying the grammar model further comprising changing from the current state to the following state of the at least one state transition, whenever the condition is fulfilled that the external function returns a non-empty string, a number or a boolean value equal to true.

Advantageously, the grammar model is represented as an augmented transition network with outputs.

Advantageously, the method further comprises:
  (iv) a step of extracting information from the natural language input using the output of the grammar model, the output of the grammar model being built based on the return value of at least one external function and one or more input labels and/or output labels.

The external function may receive a parameter, or a set of parameters, as input parameters.

The return value of an external function attached to a transition may be:
  stored in a read/write memory location, and/or
  concatenated to the output label of the state transition.

The method may be used for fault-tolerant information extraction, for instance, by tolerating morphology, syntax, semantic, or discursive issues present in the natural language input.

The external function may be a logical, string and/or mathematical operation over: its input parameters, at least a part of the natural language input, one or more states, the grammar model's outputs, and/or other data stored on the read/write memory locations.

The set of input parameters of the external function may include references to:
  literal values comprising strings, numbers, or booleans; and/or input/output variables stored in the read/write memory locations.

The external function may yield a measure for text similarity between an input variable, in particular, the input label and/or the output label of the at least one state transition, and a predetermined reference element.

The predetermined reference element may be taken from a set of read/write memory locations and/or from a set of electronic linguistic dictionaries, which comprise at least a lexical entry associated with a set of canonical, grammatical, syntactic-semantic and/or inflectional attributes.

The external function may call an external computer-implemented resource, method or service via a network, in particular, via a network that supports the Internet Protocol (IP), and wherein the external computer-implemented resource, method or service operates or returns information over the function input parameters, the natural language input, one or more states, the grammar model's outputs, and/or over a set of read/write memory locations.

The external function may be a function relating to primitive string operations, string similarity operations, the interface to external resources or methods, and/or relating to the processing of tokens, lists, numbers and/or matches.

Evaluating the external function may comprise:
 calling an external computer-implemented resource, method or service using a set of literals and/or a set of parameters from the function input values, the natural language input, one or more states and/or from a set of read/write memory locations;
 receiving a response from the computer-implemented resource or service; and
 storing the response in a memory location.

If applying the grammar model led to an accepting state of the grammar model, the method may further comprise:
 (i) indexing:
  the shortest successful paths;
  the longest successful paths; or
  all the successful paths.
 (ii) building stored outputs by concatenating:
  the input labels belonging to each of the stored successful paths; or
  the result of merging the input labels with the output labels belonging to each of the stored successful paths; or
  the result of replacing the input labels with the output labels belonging to each of the stored successful paths; or
  the result of updating the input labels with the non-empty output labels belonging to each of the stored successful paths; and
 (iii) outputting:
  a subset of the stored outputs; or
  all the stored outputs.

The method may further comprise modifying the following state and/or the output label of the at least one state transition based on the evaluation of the external function.

The method may, after receiving the natural language input and prior to applying the grammar model further comprise:
 a) identifying the main language of the natural language input;
 b) segmenting the natural language input into text blocks;
 c) splitting the text blocks into lexical units;
 d) searching on a set of electronic linguistic dictionaries for entries matching one or more of the lexical units; and
 e) assigning a lemma, a grammatical category, syntactic-semantic attributes, and/or inflectional information to one or more of the lexical units.

The method may be used for performing sentiment analysis in product reviews, developing chatbot environments, creating services to enhance and integrate customer data, improving machine translation systems, designing knowledge extraction tools for decision-supporting, or anonymizing sensitive information.

The present disclosure further provides an apparatus for fault-tolerant information extraction using an above described method.

To be more accurate, the present disclosure provides an improved computer-implemented method for automatically analyzing, in particular, with a parsing engine, a natural-language input for information extraction that yields a satisfactory recall at a high rate of precision.

Thus, according to the present disclosure, a grammar model is provided comprising a local grammar model and one or several external functions linked to or associated with the local grammar model. Applying the grammar model to at least a part of a natural-language input comprises in a step (iii) evaluating the external function attached to at least one state transition or evaluating several external functions each attached to the same or a different one of the state transitions.

The grammar model may be applied by using the parsing engine, and the step (iii) of applying the grammar model to at least a part of the natural language input, may comprise a call of the external function or functions by the parsing engine and evaluating the external function or functions on a virtual machine independent from the parsing engine.

If the one or more external functions attached to a state transition return a number, a non-empty string value (i.e., a string that has length greater than zero, or, equivalently, $|\epsilon| \neq 0$ or a non-false boolean value, the grammar model changes from a current state to a following state.

A new output may be generated by the grammar model, which may be built based:
 on at least one return value of the one or more external functions from the evaluating step (iii), wherein the at least one return value has been stored in a memory register, and
 on one or more input labels and/or output labels of the local grammar model.

If there are several external functions executed in the step (iii), the new output of the grammar model being built may be based:
 on the return values of the external functions from evaluating the external functions of the step (iii), each external function having returned a return value stored in the memory registers and/or concatenated to the output label of the state transition.

The external functions may differ from the concept of Augmented Transition Network (ATN) actions, since, on the one hand, external functions can communicate bidirectionally with the parser as well as between external functions, and, on the other hand, since they can return results to concatenate at the output of the grammar model.

While ATN actions are limited to the execution time of the local grammar model, the external functions may be evaluated on each call and can access memory registers to store global values.

ATN-based models cannot deal with unexpected parsing errors, for example, sentences that fail to be parsed because of an unknown word. An external function may allow implementing techniques of local correction at token-reading and at extended-function-calling levels.

External functions may be evaluated on-the-fly by a virtual machine and may be independent of the parsing algorithm. In other words, it is not necessary for the parser to know the external function in advance in order to be able to process it.

External functions may have access to the same resources used by the parser, such as morphological dictionaries or tokens, and can view and modify them. In addition, external functions may also have access to external resources, such as files or databases.

In the following, when reference is made to "the external function", the description shall relate to the one or more external functions attached to at least one state transition. If more than one external function is attached to one state transition, the following shall apply to at least one or to all external functions.

The external function allows extending the local grammar model such that it is possible to apply complementary information extraction techniques. Particularly, the external function may help to identify, normalize, and extract information by considering additional linguistics aspects such as deep syntax, context sensitive morphology, semantics and discursive levels, not only being limited to perform analysis based on the current sentence but also allowing to take into account the document knowledge (i.e., the gathered information from other sentences) as well as the out-of-document knowledge (i.e., the information received from other sources). Such a feature is not available in known local grammar models.

A natural-language input is an input text in a human language, such as French, English, German, or the like. For instance, a natural-language input is opposed to a formal language such as computer language; it includes a complex symbolic system with a broader vocabulary, which doesn't meet a specific design criteria. A natural-language input may particularly comprise strings of characters representing symbols, numbers, and/or words and may be organized in sentences, paragraphs, pages and/or documents.

The natural-language input may be received via any suitable input means, such as a keyboard, a touch screen, a scanner, or a microphone coupled to a natural-language recognition unit. The natural-language input may also be received from a volatile (VM) or non-volatile memory (NVM) device.

The term "a part of the natural language input" refers to a subset of the natural language input different from the complete set. For instance, the "part of the natural language input" may refer to one or more words, phrases, sentences, paragraphs or pages of the natural language input. The expression "at least a part of the natural language input", thus, means that either the complete natural language input or only a part thereof may be considered.

A grammar model generally refers to a model describing grammar or, in other words, a set of morphosyntactic rules governing the composition of sentences, particularly of words and clauses. A grammar model may thus model both the morphology and syntax of a given natural language.

The term "local grammar model" refers to a grammar model describing the rules to construct phrases used in a certain domain, such as in a certain technical field, or in a certain context. Local grammar models particularly describe local syntactic and/or semantic constraints, which may be modelled via the means of Recursive Transition Networks (RTN).

The grammar model according to the present disclosure may analyze a natural language input by the means of a computer implemented method, called herein "parsing engine". The grammar model according to the present disclosure may particularly use finite state machines or finite state transducers to parse expressions.

The grammar model may particularly be described by a connected graph structure, particularly an Augmented Transition Network (ATN) with outputs. The outputs are outputs of the grammar model obtained by applying the grammar model to an input text as further detailed below.

The external function may define an operation over the natural language input, one or more states (e.g., the current state), and/or the outputs of the model already stored on the set of read/write memory registers (or locations). For that purpose, the external function may have a read/write access to the natural language input, the states, and/or the outputs of the model. The natural language input, the one or more states, and/or the outputs of the model, thus, may each be stored on the set of read/write memory registers (or locations). The external function may also define an operation over any other kinds of data stored in one or more of the set of read/write memory registers (or locations).

In other words, the external function may implement an operation that acts on at least a part of the natural language input, at least a part of the states, at least a part of the grammar model's stored output, (which may have been generated by the grammar model according to the present disclosure, for instance, based on other external functions), return values of the external functions, and/or at least a part of data stored in a set of read/write memory locations/registers.

In other words, the external function can use stored output of the grammar model, for building new output of the grammar model, wherein each output of the grammar model may be built based:

on the return values of the external functions from step (iii), wherein the at least one return value has been stored in a memory register, and on one or more input labels and/or output labels.

The terms "memory location" or "location/register" used herein refer to a unit for storing information, i.e., a memory location/register. Particularly a register memory provides a fast access. The specification "read/write" as used herein means that both read and write access is possible on the memory/location/register.

The term "external" is used to specify that the function is linked to the local grammar model, but not part of the local grammar model, i.e., linked in a loosely coupled way. Thus, the external function is, for instance, different from normalization or segmentation functions intrinsically used as a pre-processing step during the application of a local grammar model to a text as well as it is distinct from any post-processing step performed after the application of a local grammar model. The use of the external function, thus, extends conventional or known RTN-based local grammar models. The grammar model according to the present disclosure, thus, may be referred to as "extended local grammar model", this means that the inclusion of an external function is able to extend the local grammar while the replacement of one function by another can be done without changing the grammar model itself. For example, consider an extended local grammar that treats the statement: "The sum of A and B is #". An external function, which performs the addition of A plus B (a+b) may be implemented, and the grammar may produce the output: "The sum of A and B is C" where C is the value returned by the external function, which replaces #. Substituting the addition operation with a multiplication will calculate C as the product of A and B (a·b), without changing the underlying grammar model.

The term "state" as used herein refers to a state of the grammar model, e.g., a current state or a following state of a state transition of the finite set of state transitions.

The external function may receive a set of parameters as input values (the input parameters), and return a so-called "return value".

The set of parameters may be empty. In other words, the external function may receive zero parameters as input. An external function may particularly call an external computer-implemented resource, method or service. Information stored on a register, parameters passed or created by the external function may also be forwarded to the external computer-implemented resource, method or service as input.

If the external function receives one or more parameters as input values, the parameters may particularly correspond to a part of the natural language input to which the grammar model is applied like an input label (a subset of symbols of the input alphabet) and/or an output label (a subset of symbols of the output alphabet) of the state transition to which the external function is attached. The return value may be a literal value comprising a number, a string and/or a boolean value.

The value returned by the external function is tested whether it corresponds to either a fulfilled or an unfulfilled condition. Specifically, the condition may be fulfilled whenever the return value of the external function is a number, a non-empty string or a non-false boolean value. When the condition is fulfilled, i.e., the return value is neither an empty string nor a boolean value equal to false, the state transition is followed and the grammar exploration continues. Otherwise, the state transition is not followed and the exploration resumes from the next/previous point.

The mechanism aiming to change the grammar model from a current state to a following state by means of the value returned by the external function, which is attached to the state transition, allows implementing external functions that act as conditional switches. Generally speaking, a predefined condition may be associated with or inherent to the external function. In that respect, parameters related to a condition to be met, such as thresholds, may be passed to the external function as input parameters. Equally, the parameters associated to a condition may also be predefined by the person who implements a particular extended local grammar. In other words, evaluating the external function may comprise determining whether a result obtained by evaluating the external function fulfils a predefined criterion. For example, if the input parameter is a string and a result of applying an external function that determines the length of the string is a number representing the number of characters of the string, a threshold may be predefined so that the function returns "true", and thus the transition is followed, when the length of the string is equal to or greater than the threshold. Correspondingly, when the length of the string is lower than the fixed threshold then the function returns "false" and thus the transition is not followed.

The method, thus, may implement two condition levels; a first one associated with or inherent to the external function and a second one applied to the return value to check whether the return value of the external function is a number, a non-empty string or a non-false boolean value.

A return value of the external function, when the state transition is followed, may be stored in a register and/or concatenated to the output label of at least one state transition, particularly of the state transition to which the external function is attached. The return value may also be set as the output label of the state transition to which the external function is attached. The external function may successively yield return values, for instance, if it is attached to more than one state transition. Each return value may be stored in a register and/or set as or concatenated to the output label.

The external function may implement a logical, string, and/or mathematical operation over one or more input parameters, a part of the natural-language input, one or more states and/or data received from a set of read/write memory registers or input/output (I/O) devices.

The external function can also be a logical, string and/or mathematical operation with its input parameters applied over at least a part of the natural language input, one or more states, and/or an output of the grammar model. The input parameters may, in this case, particularly comprise arguments for the external function such as a threshold value of a predefined condition associated with or inherent to the external function.

The logical, string, and/or mathematical operation may be particularly related to characters, tokens, stored matches, transitions, stored outputs, and/or stored auxiliary information belonging to a state or to the grammar model.

A token is any sequence of contiguous letters that have a collective meaning, normally the lexical units resulting from the operation to split the natural language input by whitespaces or by any other specific set of rules for non-Indo-European languages.

The stored matches, i.e., the recognized input sequences, which are stored in the memory registers, are built as long as applying the grammar model led to an accepting state of the grammar model. Stored matches could be all the successful paths or be further filtered by accepting either the shortest or the longest successful paths.

The set of parameters of the external function may include references to literal values comprising strings, numbers, and/or booleans, and/or references to input/output variables stored in the registers.

The same external function may be attached to different state transitions of the finite set of state transitions. Alternatively or additionally, different external functions may be attached to different state transitions of the finite set of state transitions. An external function may also be a logical, string and/or mathematical operation over a return value of another external function attached to a different state transition of the finite set of state transitions. In this case, the return value of the other external function is stored in a read/write memory register and then accessed by the external function operating on the return value.

The external function may particularly yield a measure for text string similarity between an input parameter, in particular, the input label and/or the output label of the at least one state transition or a part of the natural language input, and a predetermined reference element. In this way it is possible to account for noisy natural-language input that may originate, for instance, from typographical errors or errors from optical character recognition (OCR), taking into account not only the isolated input itself (the word level) but also the context at a sentence and a document level. In contrast to a purely statistical approach that may also take similarity into account, the approach using such an external function may yield a higher precision, since it is combined with the descriptive capacity of a local grammar model. Moreover, since the selection of the string similarity operation could be adapted following the type of named entity or entities to be searched, the state of the grammar model and the stored miscellaneous information and computed when the external function is called within a grammar model, the computational resources used to perform the text string similarity operation can be more efficiently prepared and used. At the same time, by allowing processing unexpected sequences under a well-defined context, the recall can be increased as compared to known local grammar models.

The similarity measure may be implemented by Key Collision Methods (n-grams, q-grams, phonetic fingerprints, hash fingerprints, etc.), Nearest Neighbour Methods (bag distance, edit distance measures, prediction by partial matching, normal distance compression, etc.) or by a combination of such approaches, for instance.

The predetermined reference element may be received from a set of read/write memory registers or I/O devices, and/or from a set of electronic linguistic dictionaries, which may particularly comprise at least one lexical entry associated with a set of canonical, grammatical, syntactic semantic, and/or inflectional attributes.

The set of registers and/or the set of electronic linguistic dictionaries may each contain one or more than one element. The set of canonical, grammatical, syntactic semantic, and/or inflectional attributes may contain zero, one or more than one element.

The external function may use an external computer-implemented resource, method or service via a communication network, in particular, via a network that supports the Internet Protocol (IP). In this way, additional resources, methods or information services may be leveraged.

When an input parameter associated with the external function comprises a string of characters, evaluating the external function may also comprise mapping any arbitrary operation over the string. For example, the external function may be configured for converting the string to lowercase or uppercase, reversing the string and/or removing the diacritical marks from it. Alternatively or additionally, evaluating the external function may comprise performing a mathematical operation, when an input parameter associated with the external function comprises a number or string.

Evaluating the external function may also comprise any other kind of operations such as extracting one or more characters from a string, determining the length of a string and/or comparing the length of a string to a predetermined number when an input parameter associated with the external function comprises a string of characters.

The external computer-implemented resource, method or service may operate on or return information over the external function's input parameters, at least a part of the natural-language input, one or more states, and/or over the content of a set of memory registers or I/O devices.

After receiving a response from the computer-implemented resource, method or service, the response may be stored in a read/write memory. Calling an external computer-implemented resource, method or service may comprise, for instance, calling an online gazetteer, a word definition database, a thesaurus data provider, a phonetic transcription service, a connect distributed data service across the Web such as a Linked Data Platform (LDP) service, or any other computer-implemented resource, method or service able to return a value useful for the processing of the external function.

Given an input sequence over an alphabet (a finite set of characters), a successful path is any sequence of connected transitions that accepts the input sequence. More specifically, a successful path is any path starting from the initial state of the grammar model and leading to the final state. If applying the grammar model led to an accepting state, the method may further comprise saving and retrieving (hereafter indexing) all the recognized input sequences belonging to a successful path in the memory or in an I/O device.

Since an input sequence could be recognized by one or more sequence of separate connected transitions, the method may further comprise indexing all the recognized sequences or only the sequences recognized by the shortest successful paths or the longest successful paths. An example is discussed further below with reference to FIG. 17.

The outputs of the grammar model, i.e., the way of combining the input labels and output labels of a successful path, may be built by A) concatenating only the input labels or B) by concatenating the result of merging the input labels, with the output labels, or C) by concatenating the results of replacing the input labels with the output labels or D) by concatenating the results of updating the input labels with the non-empty output labels. A subset of the outputs or all the outputs may be output, for instance, displayed on a graphic display device, stored in a non-volatile memory or any other I/O device. An example illustrating the different ways to build outputs is given below in connection with FIG. 15.

The method may, thus, recognize an input sequence and output a result based on one or more output labels and/or one or more input labels of state transitions of a successful path, if applying the grammar model led to an accepting state of the grammar model.

Since the output labels of the state transitions of the grammar model may be set or modified based on return values of external functions, the output of the grammar model may depend on the return values of the external functions. In other words, the output of the grammar model may be based on a combination of return values of external functions (one or more) and input/output labels of state transitions.

The method may further comprise modifying the following state and/or the output label of the at least one state transition based on the evaluation of the external function. For instance, an error in the natural-language input originating, for example, from a particular typographical error or an OCR-induced error within a named-entity in a text may be identified and then corrected on-the-fly by using outputs.

A part or all of the natural language input being accepted by the grammar model, i.e., leading to a successful path, may be categorized into an arbitrary predefined category for which the grammar model has been designed. For example, the category may be chosen among proper nouns like person-names, locations, or organizations. In this way, information may be extracted from the natural language input. The result of the information extraction, i.e., the part or all of the natural language input and the respective category may be stored in a memory and/or output on a graphic display device or any other I/O device.

Evaluating the external function may comprise creating an instance of a virtual machine (VM), in particular, a register-based virtual machine, loading source code of the external function from a memory, in particular, a memory register or an I/O device, compiling the source code into opcodes (the code representation of an instruction that can be executed by the virtual machine), executing the compiled code, storing an output of the execution, and destroying the execution instance.

After receiving the natural-language input and prior to applying the grammar model, the method may further comprise:
  a) identifying the main language of the natural-language input;
  b) segmenting the natural-language input into text blocks;
  c) splitting the text blocks into lexical units;

d) searching in a set of electronic linguistic dictionaries for entries, including but not limited toward and/or compound words, matching one or more of the lexical units; and e) assigning a lemma, a grammatical category, syntactic semantic attributes, and/or inflectional information to one or more of the lexical units.

The functions associated with the above mentioned steps may, particularly, not be identified with an external function in the sense of the present disclosure.

The method according to the present disclosure may be used for "Named-entity recognition" (NER). Named-entity recognition relates to identifying and classifying entities in the natural language input into predetermined categories such as, but not limited to, person-names, organizations, locations, time expressions, and/or quantities (distance, mass, price, etc.).

The method according to the present disclosure may particularly be used for fault-tolerant named-entity recognition. The external function may allow the extended local grammar model to be fault-tolerant against morphology, syntax, semantic and/or discursive issues present in the natural-language input. These issues are both (1) beyond the sentence level and (2) cannot be exhaustively enumerated and, thus, not modelled using a traditional local grammar.

Here (1), beyond from the sentence level, means that to recognize a named-entity, an extended local grammar can model a sequence taking not only into account the local context of a sentence (such as the neighboring words), but also considering the stored information coming from remote portions of the input text (such as sentences or paragraphs) and/or taking into account the information retrieved from an external computer-implemented resource, method or service.

In other words, other previous parts of the natural language input (for instance, neighboring parts and/or remote parts) relative to the considered part of the natural language input, which is being analyzed by the method, may be considered and used by the method to build, with the application of the method on the considered part of the natural language input, which is being analyzed, a new output of the grammar model.

Particularly, the external functions may have been applied to these neighboring parts and/or remote parts, before the application of the external functions on the considered part of the natural language input, to obtain the stored information on the shared memory register, this stored information being used by the method to build a new output of the grammar model (so as to give new information, which will be stored on the shared memory register, and so on).

In other words, the method can use the ever generated outputs (by the application of the method on the previous parts of the natural language input relative to the considered part of the natural language input, which is being analyzed), to build a new output of the grammar model (when the method is applied to the considered part of the natural language input).

On the other hand, (2) the possible input sequence issues cannot be exhaustively enumerated, means that while a traditional local grammar recognize sequences that are explicitly listed or expected, it is neither practical nor feasible to list, for example, all possible spelling, grammatical, semantic and/or discursive mistakes present on an input sequence. In this sense, an extended grammar model, which describes a pattern to recognize a named-entity can use both the local/distant context and a set of external functions implementing a way to decide, based on the gathered information and context, whether or not an unknown sequence belongs to the searched entity.

The extracted information may be used for different applications, such as to develop grammar correction systems that are aware of the document context; to anonymizing documents (e.g., by automatically replacing a person-name by a placeholder); to build question answering (QA) systems aiming to return an answer in response to the user's question; or to detected and classify the subjective context of an input sequence for sentiment analysis (SA).

The present disclosure can be implemented on any kind of computer system, such as on a desktop computer, a notebook, a tablet computer or a smartphone.

The present disclosure further provides an apparatus for fault-tolerant information extraction using an above-identified method. Fault-tolerant means the capacity to extract information from a noisy natural-language input dealing with expected and unexpected variations on the morphology, syntax, semantic and/or discursive levels of the sequences.

The present disclosure may further provide a computer system comprising a memory and a processor, wherein the memory stores computer-readable instructions, which, when executed by the processor, cause the processor to execute an above-described method.

The present disclosure further provides a computer-readable medium having computer-readable instructions thereon, which, when executed by a processor, cause the processor to execute an above-described method.

BRIEF DESCRIPTION OF THE DRAWINGS

Advantageous embodiments will now be described in combination with the enclosed figures.

DETAILED DESCRIPTION

Figure 1A:
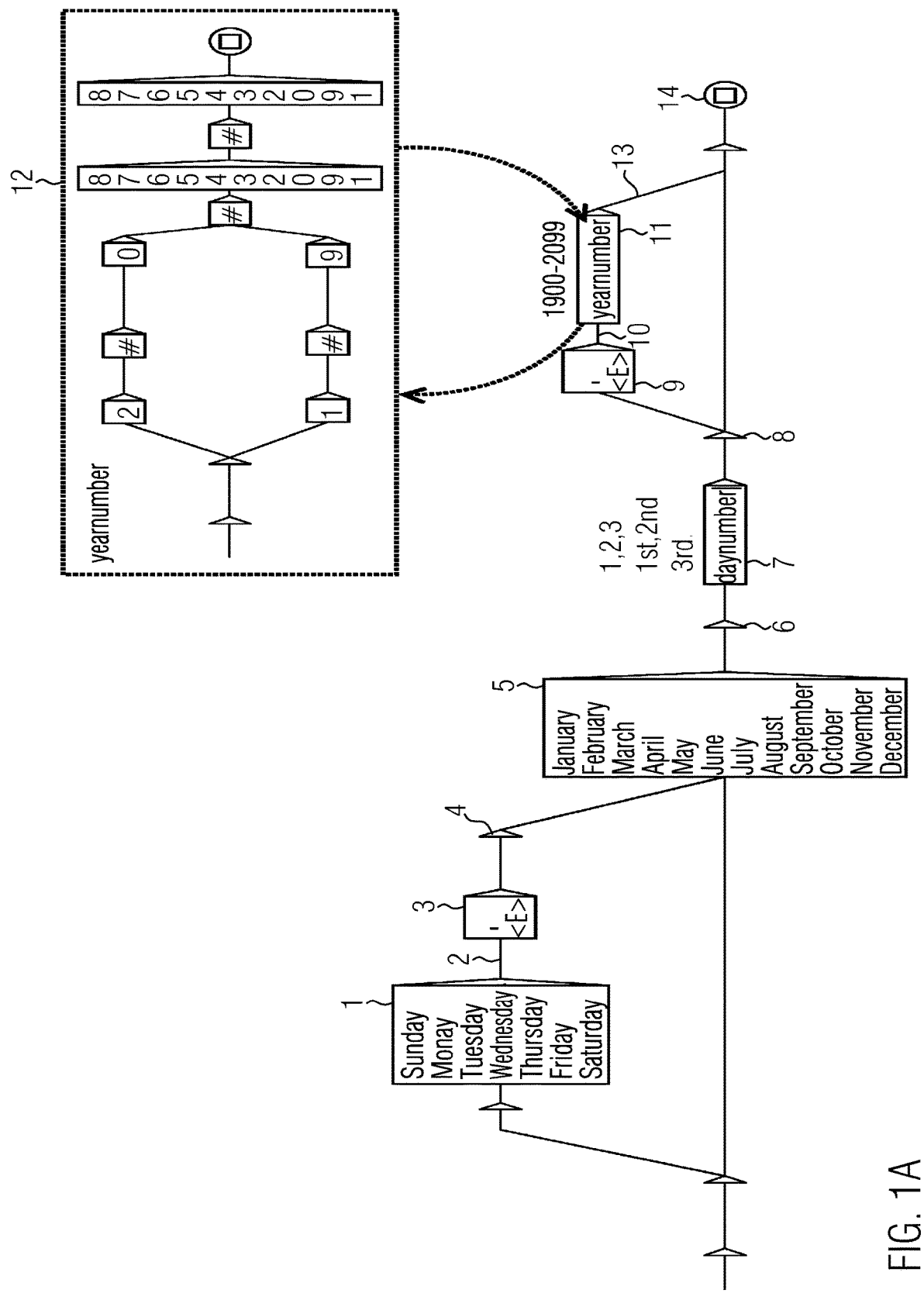
FIGS. 1A and 1B show exemplary local grammar models for identifying named entities according to the prior art.

In FIG. 1A an exemplary local grammar model for recognizing dates within a natural-language input is illustrated. Local grammar is a formalism known from the prior art, which models syntactic and/or semantic rules in the form of a graph. If this model is implemented in a computer system, it is usually represented as a recursive transition network (RTN).

As can be seen from FIG. 1A, a local grammar (LG) is graphically modelled as a connected graph, including nodes, which represent states, and edges, which represent state transitions connecting the states. A natural-language input may be analyzed to find a so-called "successful path" connecting an initial state (on the left-hand side of FIG. 1A) to the final state (on the right-hand side of FIG. 1A). Such a successful path can be realized, if at least a part of the natural-language input corresponds to the structure modelled by the local grammar model, i.e., a part of the input sequence can be recognized, starting from the initial state and yielding to the final state, by following each of the connected transitions.

As an example, a natural-language input or text may contain the phrase "Friday, Jun. 26, 2015." When analyzing the text, the local grammar model, thus, would find that "Friday" matches one of the register entries related to the first node 1 of the local grammar model. The state would then change, via state transition 2, to the following state 3. Since the comma in the exemplary expression matches one of the register entries of state 3, the state changes via state transition 4 to state 5. There, a match with the register entry "June" of node 5 can be found so that the state changes via state transition 6 to node 7. At node 7, a match within a sub-graph, similar to 12, that recognizes the day number 26 is found, so that the state changes via state transition 8 to the following state 9. A blank (i.e., an epsilon ($\epsilon$) input) in the exemplary expression then matches with a register entry of state 9 (<E> in the graph), so that the state changes via state transition 10 to the following state 11. State 11 contains a call to a sub-graph 12 that again consists of nodes and edges (states and state transitions) and yields the year number, 2015, of the exemplary expression. The state, thus, finally changes via state transition 13 to a final state 14.

The exemplary expression "Friday, Jun. 26, 2015", thus, yields a successful path in the local grammar model of FIG. 1A. The local grammar model of FIG. 1A, thus, would have been able to extract the exemplary expression from the natural-language input and classify it as a date.

Identifying time expressions from a natural-language input is just one example of the use of local grammar models for information extraction. Since the local grammar takes the expected structure into account, the precision of identifying elements within a natural-language input is high. However, local grammar models suffer various drawbacks, for instance, when the natural-language input is noisy, for example, in view of typographical errors or errors stemming from optical character recognition. For instance, if the exemplary expression were "Friday, Jun. 26, 2015", the local grammar model of FIG. 1A would not be able to identify this expression as a date in the natural-language input. For state 5, no match could be found with one of the register entries of state 5 so that the state would not change via state transition 6 to the following state 7. Thus, no successful path could be achieved. In view of this, the recall of local grammar models is usually low.

Figure 1B:
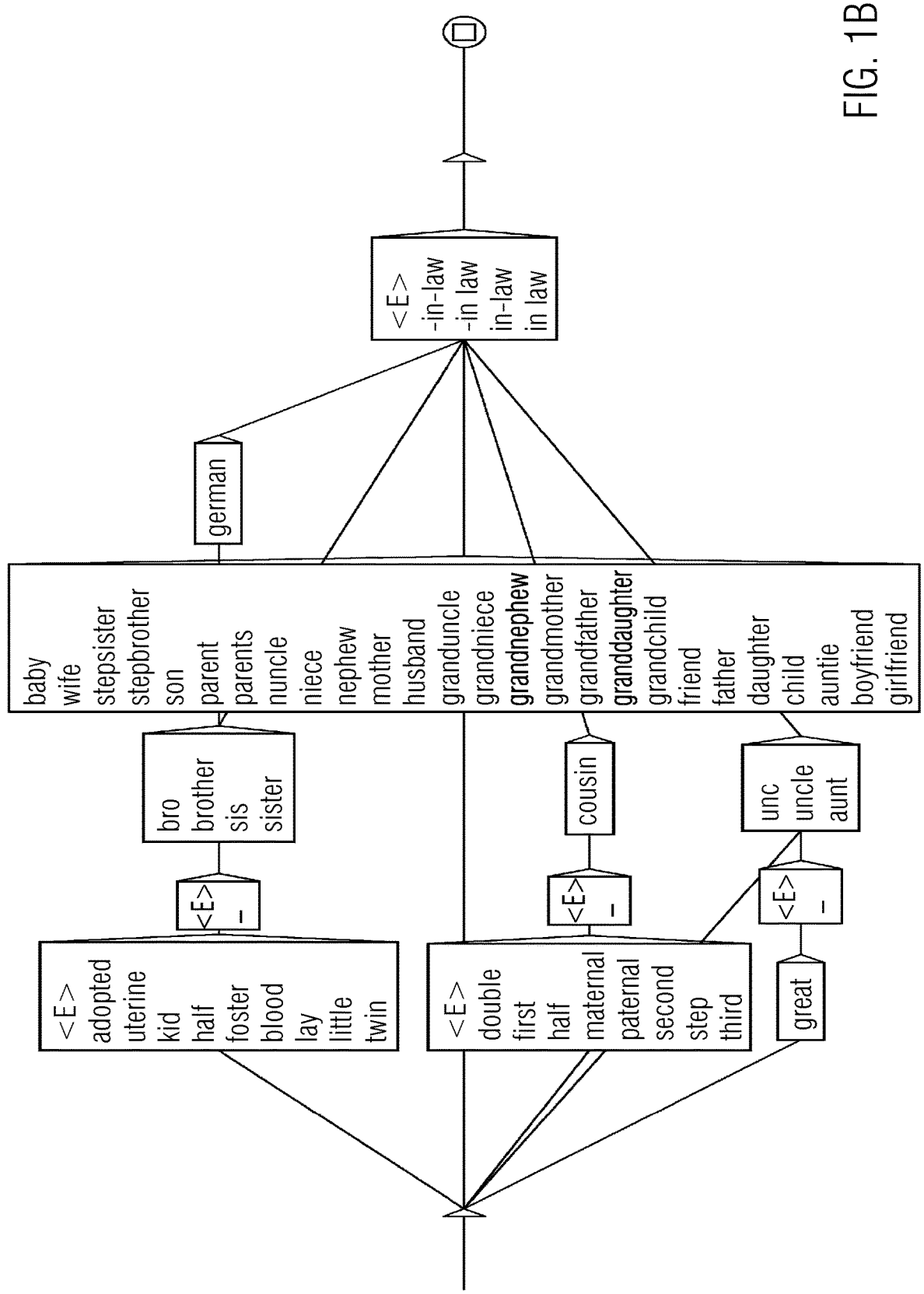

FIG. 1B shows another example of local grammar according to the state of the art. This local grammar may be used to identify information on degrees of relationship in a given input text. For instance, this local grammar model could be applied to the input sentence "Hemings was the half brother-in-law of Thomas Jefferson". As a result, the degree of relationship "half brother-in-law" could be identified. No successful path could be found, for instance, for the input sentence "Hemings was the first African-American graduate of Vassar College".

The present disclosure extends the formalism of local grammar models by allowing to attach at least one external function to at least one state transition of the grammar model. This external function is external in the sense that the function is loosely coupled and not part of the local grammar model used for modelling the syntactic and semantic structure of the desired content. Formally, the grammar model of the present disclosure can be defined in the form of a finite state machine, in particular, an Augmented Transition Network (ATN) with outputs.

More specifically, the grammar model according to the present disclosure may be described as a 7-tuple $G=(Q, \Sigma, \Gamma, I, F, E, s)$ over $\Phi$ external functions, wherein:

Q is a finite set of states (the nodes of the graph)

$\Sigma$ is an input alphabet comprising a finite set of symbols $\Gamma$ is an output alphabet comprising a finite set of symbols I is a set of sub-graphs $F \subseteq Q$ is a set of accepting states $(F \neq \emptyset)$ $E \subseteq Q \times (\Sigma \cup \{\square\}) \times (\Phi \cup \{\epsilon\}) \times (\Gamma \cup \{\epsilon\}) \times Q$ is a finite set of state transitions.

$s \in Q$ is the unique initial state.

Each state transition $t=(p[t], \ell i[t], \ell o[t], n[t]) \in E$ is a transition from a current state p to a following state n, with an input label $\ell i[t]$, an external function f[t], and an output label $\ell o[t]$. The set of external functions $\Phi$ over the Augmented Transition Network above is one of decisive difference to known local grammar models. By means of the extended function, other differences are 1) the possibility to use the value returned by an external function as a condition that must be satisfied to advance to the following state, 2) the possibility to read or store global (not only local) data in a set of read/write memory registers or any other I/O device and 3), to have access to the natural language input and one or more states, including the already stored successful paths.

The input label $\ell i[t]$ may comprise portions of the natural language input, particularly individual words, meta-symbols (representing a set of distinguishable elements, e.g., <NB> for numbers), a call for a sub-graph (e.g., by reference to its name) or an empty set ($\epsilon$ represented by its meta-symbol <E>). The output label $\ell o[t]$ may be none or may contain a finite sequence of symbols belonging to the output alphabet ($\Gamma$), for instance, based on a return value of the external function. The output label may be ignored, concatenated with a recognized entity in the natural language input (e.g., in the sense of an annotation) or may replace or update a part of the natural language input, particularly a part or all of the recognized entity in the natural language input.

Figure 2A:
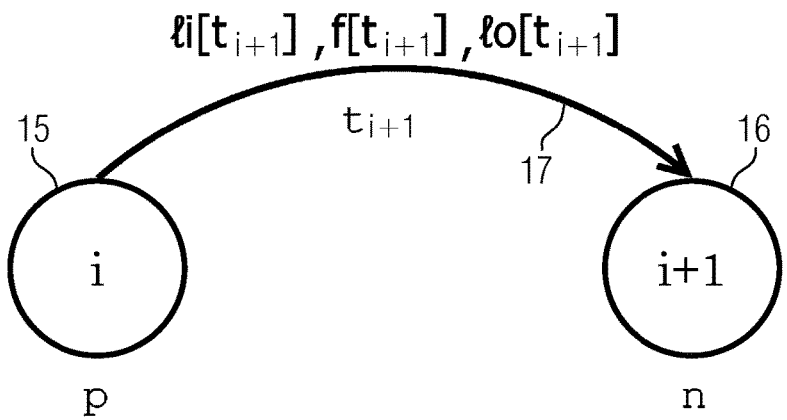
FIGS. 2A and 2B illustrate exemplary state transitions of a grammar model according to the present disclosure.

FIG. 2A shows an exemplary state transition between a current state (i) 15 and a following state (i+1) 16 according to the present disclosure. The state transition is associated with an input label $\ell$ i and an output label $\ell$ o, as in the case of a traditional local grammar model. Additionally, however, an external function f is attached to the transition. The external function returns a value and can also acts as a conditional switch. In other words, whenever the return value of the external function f is a number, a non-empty string or a non-false boolean value, an implicit condition to continue to the next state is considered as fulfilled and the grammar model changes from the current state 15 to the following state 16. The external function f is generally represented by a pair <<i:o>> comprising a set of input parameters "i" and a return value "o". The return value may be a boolean value. In this case, the condition to move to the next state is fulfilled whenever the return value is "true" and not "false". The return value may also correspond to a number or a string. In the last case, a return value fulfils the condition to continue to the next state whenever it is different from an empty set (in other words, the function evaluation yields an output). By using this mechanism, it is also possible to design explicit conditions over the natural language input, one or more states, the already stored outputs of the model, and/or over data in the memory registers, to allow or disallow to continue the exploration of a path. For instance, if the function receives a word as input sequence, an explicit condition may be defined so that the function returns the boolean value "true", and hence the transition follows the next state, only if the word is a hyponym of another word in the sequence. For example, given the following sentences: "Salmon is the common name for several species of fish" and "Salmon calcitonin is a peptide hormone"; the extended function can use a hyponym database to return true whether two nouns are hyponyms and hence help the grammar to state that the first occurrence of salmon is as a fish while the second is a hormone. Further techniques known per se to the prior art can be implemented, for example, to fuzzy compare a noun (e.g., salmon) with an unknown sequence (e.g., homone) to state about their hyponym relation.

Figure 2B:
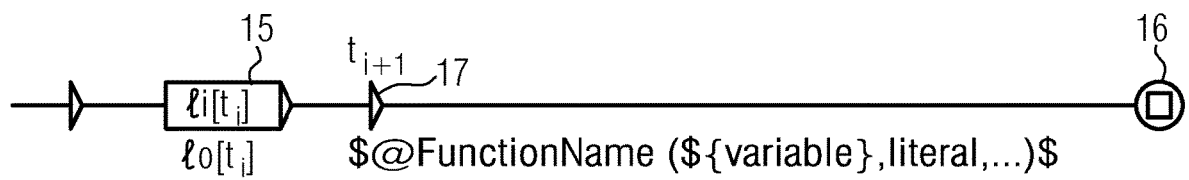

FIG. 2B shows the graph representation of the state transition 17 from a current state 15 to a following state 16. The following state 16 is also shown as a final state in this example. The external function attached to the transition 17 is, by convention, identified by a function name prefixed by the "at sign" (@) and enclosed between dollar ($) signs. Different kinds of parameters, enclosed by single parentheses and separated by single colons, can be used as input parameters for the function, such as variables stored in a memory (which are referred by their name enclosed with curly braces ({,}) and prefixed by a dollar sign) or literals of the natural language input that is analyzed. It is even possible that the external function is called without any input parameters.

Figure 3:
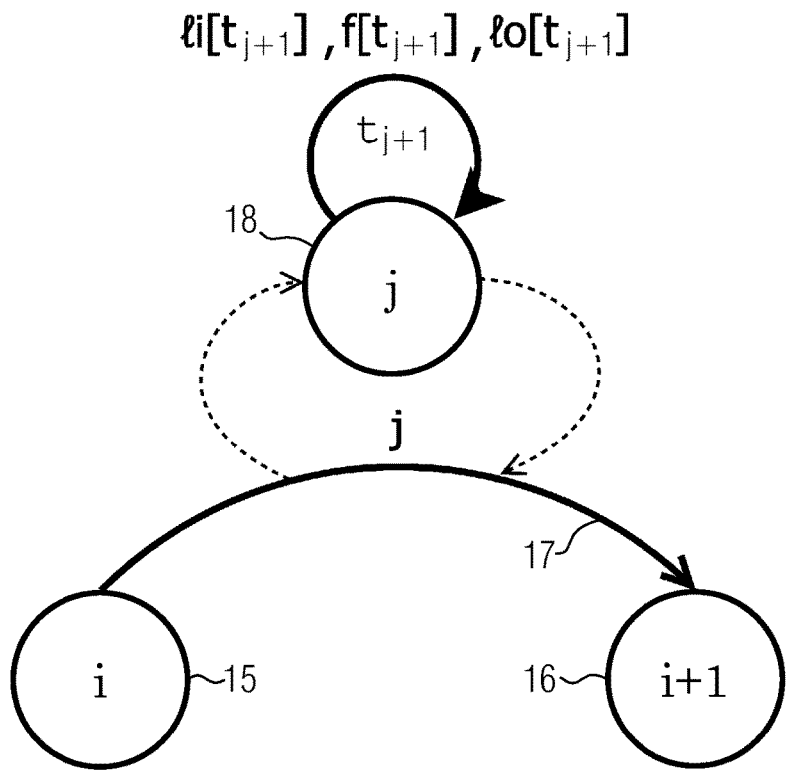
FIG. 3 illustrates another exemplary state transition of a grammar model according to the present disclosure.

FIG. 3 shows another example of a state transition 17 that could be used in a grammar model according to the present disclosure. In this case, a sub-graph (j) is called with an initial and final state 18. State transitions in this sub-graph may also be linked to at least one external function f.

Figure 4:
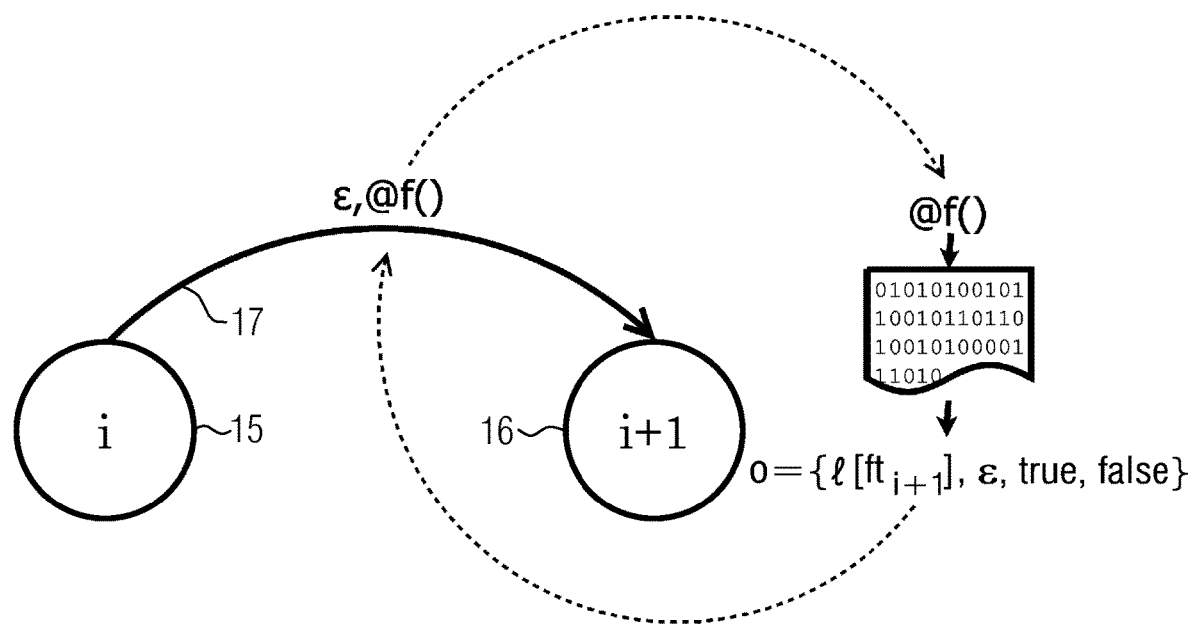
FIG. 4 illustrates another exemplary state transition of a grammar model according to the present disclosure.

FIG. 4 shows a further example of a state transition 17 that could be used in a grammar model according to the present disclosure. In this case, the state transition 17 has no input label or output label, but only a function call to an external function f. The external function f does not receive input parameters from the state transition 17 in this example. The external function f may particularly call an external computer-implemented resource, method or service or use the information already stored on the registers. After being evaluated, the function f returns a value o. The state changes from the current state 15 to the following state 16 if the return value differs from the boolean "false" or from the string empty set ϵ.

Figure 5:
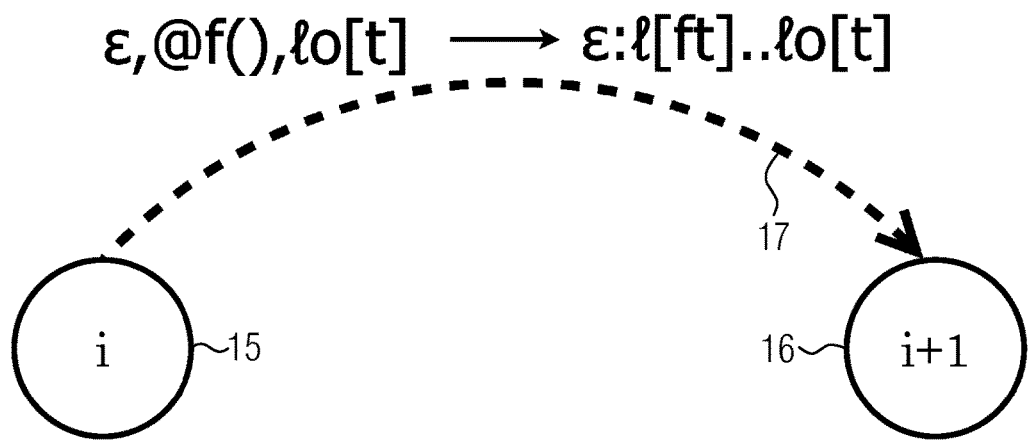
FIG. 5 illustrates a further exemplary state transition of a grammar model according to the present disclosure.

The return value $\ell[ft]$ of the external function f may be concatenated with the output label $\ell o[t]$ of the state transition 17. In this way, the output label of the state transition 17 may be changed. This case is illustrated in FIG. 5.

Figure 6A:
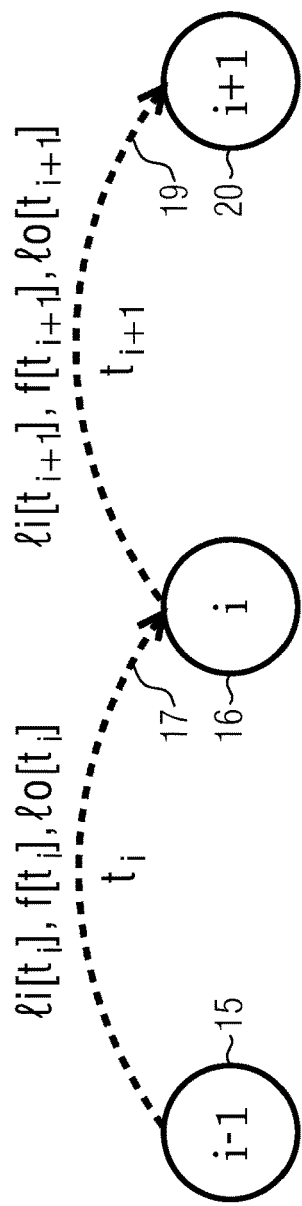
FIGS. 6A and 6B illustrate exemplary combinations of state transitions of a grammar model according to the present disclosure.

FIG. 6A shows a sequence of two state transitions 17, 19 between three states 15, 16, 20. Such a sequence of state transitions can be called a "path" within the graph of the grammar model. Both the first state transition 17 and the second state transition 19 can have attached thereto an external function f that may be different from one other or the same. The input label of the path may correspond to the concatenation of the input labels of the state transition 17, 19 ($\ell i[ti]$ ... $\ell i[ti+1]$) and the output label of the path may correspond to the concatenation of the output labels of the state transition 17, 19 ($\ell o[ti]$ ... $\ell o[ti+1]$).

Figure 6B:
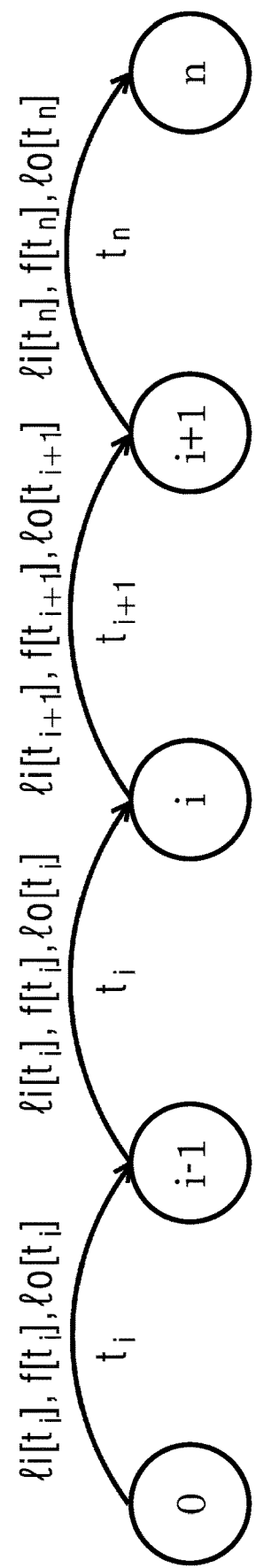

Given an input sequence over the alphabet Σ, if there is a path sequence of connected transitions, leading from the initial state to a final state of the graph, that recognize the input sequence, this path is an "acceptance path" or so called a "successful path". Such successful path is illustrated in FIG. 6B.

A sub-sequence of characters of the natural-language input is, thus, said to be accepted by the grammar model if, starting from the initial state and leading to the final state, there is a successful path with an input label equal to the sub-sequence.

When a sub-sequence of characters from the natural-language input is accepted by the grammar model, the sub-sequence may be further identified and indexed accordingly.

The external function f may be chosen according to the circumstances and requirements of the particular information-extraction problem. The external function may be stored in a library of external functions so that it is reusable by different grammar models. In general, a set of external functions may be linked to the local grammar model in a grammar model according to the present disclosure. In other words, more than one, particularly different, external functions may be associated with one or more state transitions of the grammar model. In this way, many problems of information extraction may be flexibly addressed by an appropriate choice and application of the external functions.

One example for an external function that can help improving the information-extraction recall yields a measure for text similarity between an input variable and a predetermined reference element, for instance, a reference element taken from a set of read/write registers, an I/O device, and/or from a set of electronic linguistic dictionaries. For the text similarity measure, for instance, an approach known from the prior art to efficiently calculate (i.e., reducing the number of comparisons) the edit distance over an already stored structure may be employed. The external function may then yield a number representing the similarity measure between the input parameter and, for instance, an element of an electronic linguistic dictionary. Evaluating the external function may then comprise comparing the resulting similarity measure to a threshold value in order to determine whether the state shall change from the current state to the following state. The external function used to calculate the edit distance may return a boolean value equal to "true" if an entry in the electronic linguistic dictionary has a similarity with the input parameter larger than a given threshold passed on as input. Alternatively the reference element having a similarity measure above the threshold may be returned by the external function as return value. If there is more than one entry in the electronic linguistic dictionary having a similarity measure above the threshold, the element of the electronic linguistic dictionary most similar to the input parameter may be used. At the same time, the way to choose the measure of similarity to apply, the threshold to satisfy, or the subset of dictionary entries to be compared, can be defined based on a state, the already stored outputs of the model, and/or a set of memory registers.

By using such a text similarity measure within a defined context, errors originating, for instance, from a wrong OCR may be taken into account. In the above example, the term "Juno" would yield a high similarity measure to the month "June". While the term itself "Juno" can be related to a Roman goddess, a town, a film or even a given name, the way that the grammar model describes a date expression, allows to precisely identify and classify the sequence "Friday, Juno 26, 2015" as a date. Under the described context, this may still be true, for any expected or unexpected variation: "Ju ne", "jul3o", "Uune". Since such potential variants are practically infinite in number, it would not be possible for a traditional local grammar to enumerate them exhaustively. On the other hand, using the prior art machine learning-based approaches, two drawbacks to recognize the same date expression can be highlighted: 1) the learning phase requires a large hand-labelled sample of positive (real date expressions with noisy) and negative (not real date expressions with noisy) examples (for OCR documents this is not practical to build); 2) if the input sequence is short, e.g., only formed by a single data expression, the machine learning model will not have enough of data to use as evidence and likely will perform with low precision, e.g., on the sentence "Night of Champions, 2nd 2004" the sequence "Champions, 2nd 2004" will be incorrectly identified as a date.

In general, an electronic linguistic dictionary may correspond to a plain-text file comprising one entry per line, such as simple words or compound words. For instance, entries of an electronic linguistic dictionary may appear as follows:

currency, currency. N:s
currencies, currency.N:p
currency policy, .N:s
currency policies, currency policy.N:p wherein the inflected form is followed by the canonical form (e.g., currency), the grammatical category (e.g., a noun: N), possibly semantic attributes and inflectional information (:s singular, :p plural, :s:p both).

Figure 7:
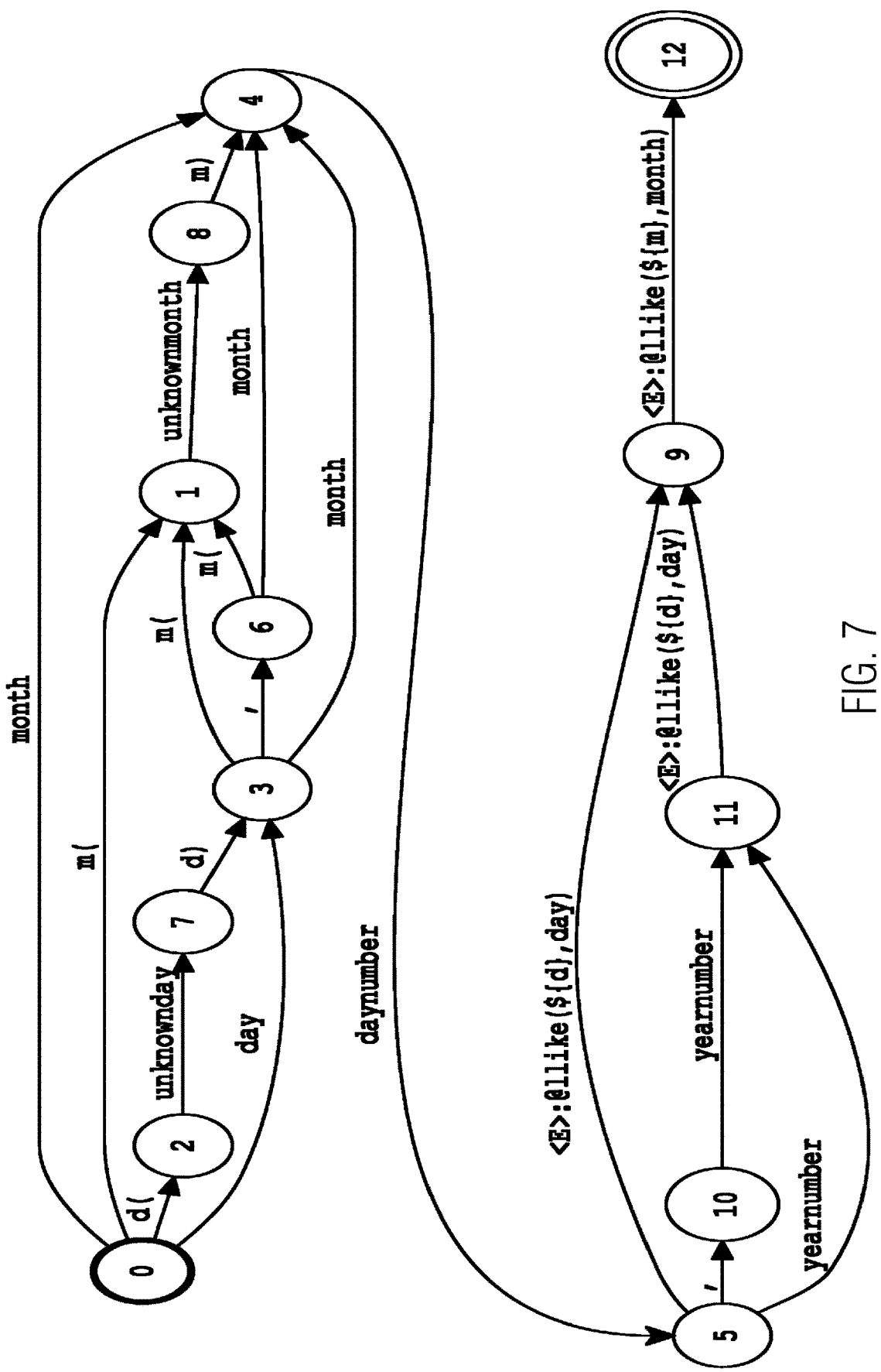
FIG. 7 illustrates an exemplary grammar model according to the present disclosure for identifying a date.

FIG. 7 shows an automata representation of a grammar model according to the present disclosure for identifying a date taking into account deviations from the correct spelling of both months and day names via an external function named "hike" (looks like). The following sample-code shows a naive implementation of the "hike" function:

```
--returns true when the input looks like a date entity (month or day)
    function llike (input , entity, threshold)
        if input == nil then return true end
        if entity == 'month' then
            if distance ({' January ', ' February ', ...}, input) <= threshold
                then return true
            end
        elseif entity == 'day' then
            if distance ({' Sunday ', ' Monday ', ... }, input) <= threshold
                then return true
            end
        end
    end
```

The present disclosure, however, is not limited to an external function that yields a measurement for similarity. The external function may implement any logical, string, mathematical and/or other operation over any kinds of input parameters, such as over at least a part of the natural-language input, over one or more states, and/or over a set of read/write memory registers or I/O devices.

For instance, the external function can perform a statistical operation.

The following table lists some exemplary external functions that could be applied individually or in any combination in a grammar model according to the present disclosure.

| Class | Function | Description |
|---|---|---|
| String Similarity | sounds_like | Test if a string sounds like another string belonging to an electronic linguistic dictionary |
| | edit_distance | Test if a string has an edit distance lower than a threshold from another string belonging to an electronic linguistic dictionary |
| Primitive Strings Operations | equal | Test if a string is equal to another |
| | first_letter | Get the first letter of a word in a sequence of words |
| | has_number | Test if a string has any number (e.g., 22th) |
| | has_mixed_case | Test if a string has mixed case (e.g., McDonalds) |
| | length | Get the length of a string |
| | length greater | Test if the length of a string is greater than another |
| | lower | Convert a string to lowercase |
| | reverse | Reverse a string |
| | substring | Extract the characters from a string |
| | upper | Convert a string to uppercase |
| | define | Get the definition of a word using an external web service |
| External Resources Interface | espeaker | Interface with an speech synthesizer, to convert a string to speech |
| | pronunciation | Get the phonetic transcription of a word using an external web service |
| | spellcheck | Find out the spelling mistakes on a word |
| Tokens | get_infected | Get the infected form of a token belonging to an electronic linguistic dictionary |
| | get_lemma | Get the lemma of a token belonging to an electronic linguistic dictionary |
| | get_code | Get a grammatical, semantical or inflectional code of a token belonging to an electronic linguistic dictionary |
| | get_at | Get a token at a determined position of the input sequence |
| Lists | list_get | Get the element at position n in a list |
| | list_front | Get the first element in a list |
| | list_back | Get the last element in a list |
| Numbers | greater | Test if a number is greater than another |
| | increment | Get the result to add 1 to a number |
| | is_zero | Test if a number is equal to zero |
| | lower_equal | Test if a number is lower or equal to another |
| | random_number | Get a random number |
| Matches | bos | Test if a match (a recognized sequence) start just before the beginning of a sentence |
| | eos | Test if a match end just after the end of a sentence |
| | start_with_space | Test if a match start just before a space |

In another example, not illustrated in the figures, a grammar model according to the present disclosure may be used to identify citations in a document, e.g., non-patent literature references cited in patent applications. Since patent applications are filed in almost all technical field and without any predefined citation style, it is practically impossible to build a traditional local grammar model to achieve a high recall mining this data. For instance, it is impossible or impractical to enumerate each author's name in an electronic linguistic dictionary or listing all possible variations on the corresponding labels of the local grammar model. The grammar model according to the present disclosure offers a solution to this problem by providing an external function that calls an external computer-implemented resource, method or service via a network, in particular, via the Internet. For instance, a potential author name could be forwarded by the external function as an input parameter for an Internet search. If the Internet search reveals a publication for the name, the external function may return a boolean "true" so that the corresponding word of the natural-language input, particularly of the patent application, is identified as author name. The corresponding grammar model can change to a following state, where, for instance, journal data or publication dates may be identified via further state transitions. In this way, citations of non-patent literature in patent applications can be reliably identified and validated without performing extra post-processing steps.

In the following, further steps of a method for automatically analyzing natural-language input for information extraction are described. The present disclosure is, however, not limited to the specific order and number of steps described below. The following description is merely for illustrational purposes.

STEP 1: Receiving the natural-language input from a data source. The data source may be an input/output (I/O) device, particularly a register storage. The natural-language input may have been entered into a computer system via a keyboard, a scanner, or another appropriate input means and then stored in the I/O device. When entered via a scanner, the scanned image may have been treated using optical character recognition (OCR).

STEP 2: Identifying the main language of the natural-language input. This step may be performed, for instance, using known N-gram-based text categorization methods, Prediction by Partial Matching (PPM) methods, or Deep Neural Networks (DNN) methods.

STEP 3: Normalizing text sequences. This normalization aims at identifying and replacing or substituting parts of the natural-language input that should not be used for the analysis, for instance, HTML or XML tags, or control characters such as carriage returns or tab characters. Such characters may be substituted, for instance, by blanks. This step may be performed, for instance, using known regular expressions methods, or boilerplate detection approaches using shallow text features.

STEP 4: Segmentation of the natural-language input into blocks, particularly sentences. For this purpose, known sentence-boundary detection methods may be used, for instance, based on finite-state transducers (FST), Maximum Entropy (MaxEnt) Classifiers, or known unsupervised learning methods.

STEP 5: Normalization of unambiguous expressions contained in the natural-language input. This step aims at replacing different forms of expressions by a normalized form, if the replacement can be made unambiguously. For instance, the expression "she's" can be replaced by "she is", or the expression "won't" may be replaced by the expression "will not".

STEP 6: Splitting the text blocks into lexical units. This operation can be performed using common separators between lexical units, depending on the language. For instance, for Indo-European languages, blanks may be identified as separating different lexical units. For this step, finite-state transducers (FST) or known statistical models may be used.

STEP 7: Searching in a set of linguistic electronic dictionaries for entries matching one or more of the lexical units. The electronic linguistic dictionaries may comprise simple words or composed words, each associated with a lemma, grammatical rules, semantic rules, and/or inflecting rules. A lemma is the canonical form or dictionary form of a set of words. For instance, the lemma "run" is used for different forms of the same lexical unit or lexeme (run, runs, ran, running). Dictionaries can be built using known hash tables or inverted indexes or alternatively stored in compressed form as know Acyclic Deterministic Finite Automatons (ADFAs).

STEP 8: Assigning a lemma, a grammatical category, a syntactic semantic attribute, and/or inflectional information to one or more of the lexical units. In this way, it can be determined, for instance, whether a lexical unit (e.g., John) of the natural-language input potentially qualifies as, for instance, a person name (e.g., GivenName). In the above-mentioned example relating to citations in patent applications, a dictionary entry like "John,.N+Hum+GivenName" may be present.

STEP 9: Applying a grammar model to an input sequence evaluating an external function attached to a state transition of the finite set of state transitions of the grammar model. This step has been described in greater detail herein above.

STEP 10: Storing the results in a volatile or non-volatile memory, particularly in an I/O device.

Figure 8:
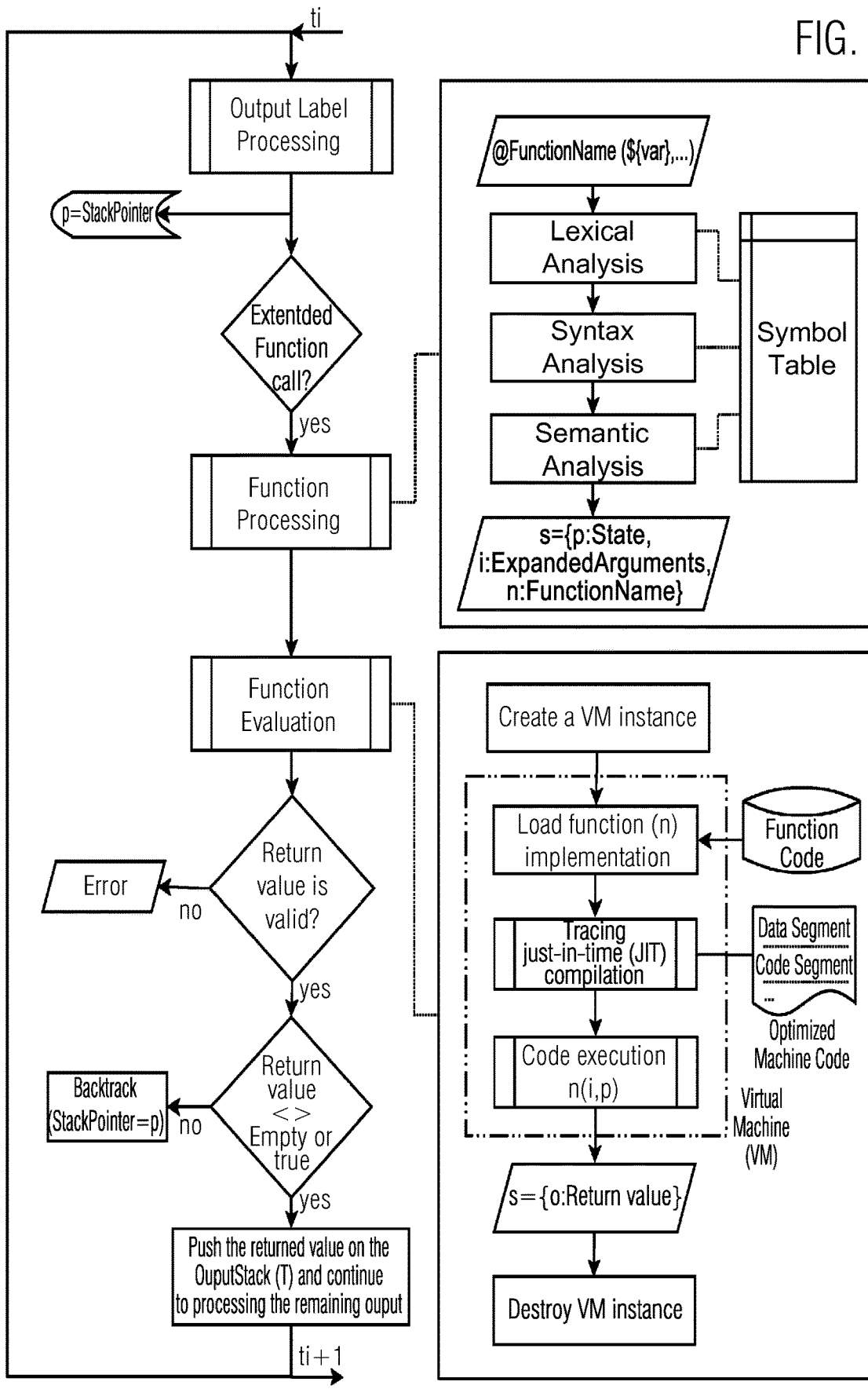
FIG. 8 illustrates a possible implementation of an extended function interpreter coupled to the grammar model according to the present disclosure.

FIG. 8 illustrates a possible implementation of the method to evaluate the external function attached to a state transition according to the present disclosure.

If an external function is called in relation to a state transition (ti), the function is first analyzed in view of its function name and its input/output parameters. For this purpose, known lexical, syntax, and semantic analysis is performed. A data stack (S) is obtained, comprising a stack pointer p to the current state of the grammar model, the expanded input parameters (here the action to expand a variable means to convert an expression like ${foo} into the value pointing to the register associated to the variable named foo), and the function name n.

To evaluate the function, an instance of a register-based virtual machine (VM) is created, i.e., an instance of a computer device operating in a virtual model and thus able to mimic or emulate the behavior of a specific computer system. The VM instance loads the source code for the function, performs a just-in-time compilation to convert the source code into opcodes (i.e., the code representation of an instruction that can be executed by the virtual machine), and then executes the executable function code. The external function may be written in a dynamically typed language. The return value of the function evaluation may then be analyzed to determine whether the state shall change to the following state. The return value may also be stored in a storage device or concatenated with the output label of the state transition. The virtual machine execution instance may thereafter be destroyed.

Figure 9:
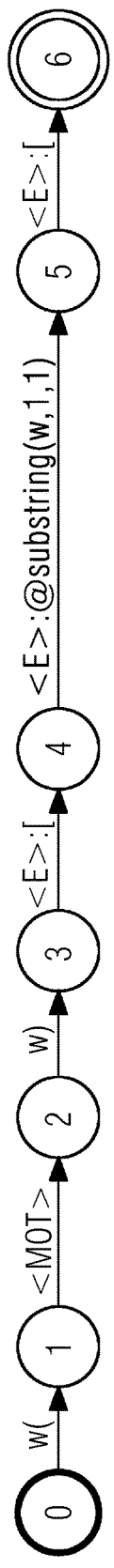
FIG. 9 illustrates an exemplary application of a grammar model according to the present disclosure.

FIG. 9 shows another example of an application of the local grammar model according to the present disclosure. In this example, an external function called "substring" is used to extract a substring from an arbitrary word ("<MOT>") stored on a variable named w from a starting position and a determined length. The extracted substring shall particularly correspond to the first letter of the string. The starting position, thus, is "1" and the length of the substring is "1" as well. Applied to the word "As" the value returned by the substring function will be "A", applied to the word "Soon" the value returned will be "S" and so on. Considering, for example, the input text "As Soon As Possible", this local grammar yields the output "[A] [S] [A] [P]". It should be noted that the state transitions from states 3 to 4 and 5 to 6 have as output label the sequences "[" (open square bracket) and "]" (closed square bracket followed by a space character), respectively. The output of the graph, thus, corresponds to a concatenation of the output labels of the state transitions 3 to 4, 4 to 5 and 5 to 6.

Figure 10:
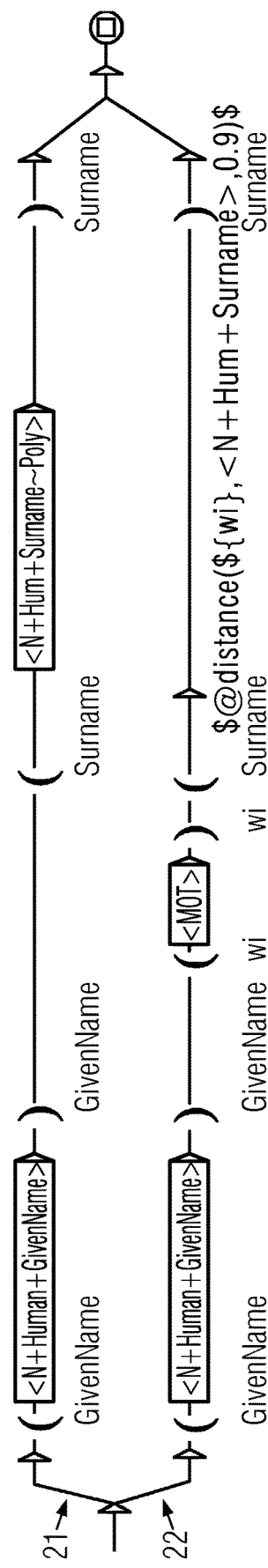
FIG. 10 illustrates another exemplary application of a grammar model according to the present disclosure.

FIG. 10 shows another example that should illustrate the possible use of a grammar model according to the present disclosure. The grammar model of this example may be used for named entity extraction, particularly for identifying combinations of a given name followed by a known surname (upper path 21) or followed by an unknown surname (bottom path 22). To render the named entity extraction fault-tolerant, the external function named "distance" is used, which measures the text distance between an arbitrary word ("<MOT>") stored on a variable named wi and a reference object; specifically it calculates the distance between the content of wi and all the entries belonging to an electronic dictionary that have the attributes N (noun), Hum (human), and Surname; e.g., against the following dictionary entry: Schrodinger, .N+Hum+Surname. Again, known key collision methods or nearest neighbor (k-NN) methods may be used to implement the similarity function, similar to the "llike" function discussed above. As threshold value, in this example, 90% is used. From the input text "on 20 may 1910, erwin schrdinger, the nobel prize-winning austrian physicist, was awarded his doctorate" the grammar model could successfully extract, by exploring the bottom path 22, the name "Erwin Schrödinger" while this would not be possible with standard local grammar models known in the art in view of the unpredicted typographic error "schrdinger". The grammar model according to the present disclosure, thus, allows a fault-tolerant information extraction, as discussed above. On the other hand, if both the given name and surname are already recognized by the application of a set of linguistic dictionaries as detailed above on the Steps 7 and 8, a person-name will be recognized exploring only the upper path 21 of the graph. For example, given the dictionary entries: "Kurt, .N+Hum+GivenName", "Gödel,. +Hum+Surname" and the input "Mathematician Kurt Gödel made his fame in 1931", starting from the initial state, the grammar model will explore the upper path 21 recognizing "Kurt" as a given name and consecutively "Gödel" as a surname, leading the graph to the final state and thus having "Kurt Gödel" as a matched sequence.

Figure 11:
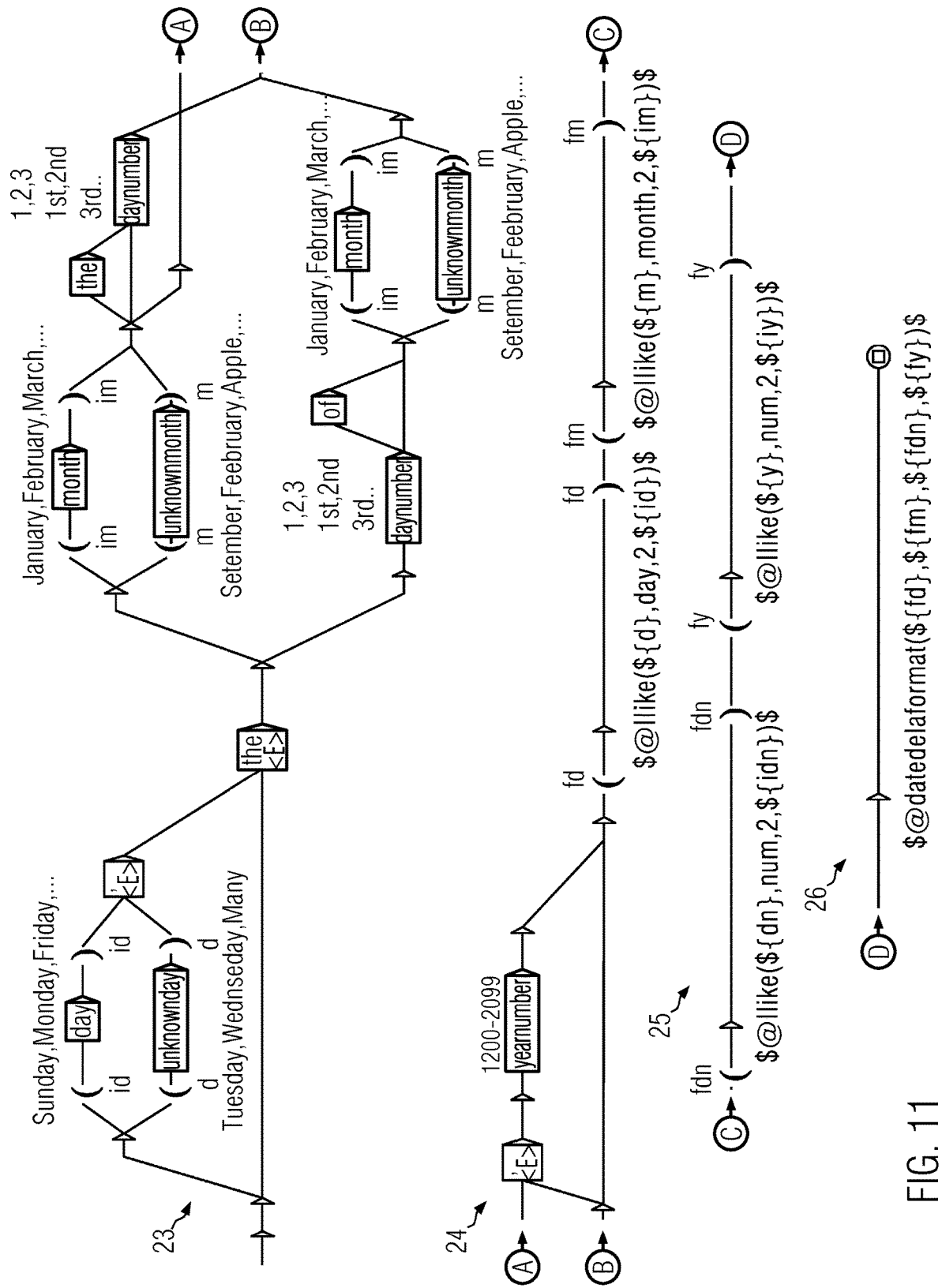
FIG. 11 illustrates further details of an exemplary grammar model according to the present disclosure for identifying a date.

FIG. 11 shows a more detailed graph of a grammar model for extracting dates from a natural language input according to the present disclosure. It is basically a different presentation of the graph shown in FIG. 7. In view of the size of the graph, it has been split into four parts that are actually connected. The uppermost part 23 ends in connecting points A and B, which continue in the second part from the top 24. Part 24 ends in connecting point C, which continues in the third part from the top 25. Part 25 ends in connecting point D, which continues in the bottom part 26. Note that the connecting points A, B, C and D are not part of the actual graph but are only intended to illustrate how the parts of the graph are interconnected.

The function llike receives 4 parameters: (1) a possibly empty variable containing an unknown sequence potentially related to a day name, month name, day number or year number, (2) a literal indicating the type of sequence to be compared: day, month or numeral, (3) the maximum allowed number of text edit operations and (4) a possibly empty variable containing a well-identified day name, month name, day number or year number. When processing the function, 3 possible cases are analyzed: (A) If both first and fourth parameters are empty (i.e., there is not such sequence to compare) the function returns "true" and then the exploration continues. (B) If the fourth parameter is not empty, the function returns its content (the well-identified sequence that was passed in) and then the exploration continues, if not, (C) the edit distance between the content of the first parameter (the unknown sequence) and a list of elements defined by the second parameter (e.g., the literal "month" to instruct the function to compare against all know month names), is calculated. If the result is lower or equal to the third literal parameter (i.e., 2, the maximal allowed number of edit operations) the function will return the most similar element (e.g., December for Dcember). Otherwise, if the number of edit operations is greater, the function will return "false" and the path will not be further explored. Variables fd, fm, fdn and fy are, respectively, used to store (if any) a well-identified sequence (case B) or the suggest correction (case C) for unknowns day names, month names, day number and year numbers. Utilizing the previously saved variables, an additional external function "datedelaformat" is finally used to output the extracted date in a specific predefined format. For example, while an input expression like "Dcember 21, 1985" will be recognized taken the path, which is labelled as: {<E>, unknownmonth, daynumber, comma, yearnumber} and that verifies the external functions to test for day names (variable fd, case A), month names (variable fm, case C), day numbers (variable fdn, case B) and year numbers (variable fy, case B); the expression "champions 2nd, 2004," which have a similar path will fail while testing "Champions" as a month name (i.e., the edit distance between any month name and Champions is greater than 2).

In the graph of FIG. 11, more particularly, the variable "id" refers to an identified day, "d" refers to an unknown day, "im" refers to an identified month, "m" refers to an unknown month, "fd" refers to the result of the llike function applied to a day and "fm" refers to the result of the llike function applied to a month. Not further illustrated in FIG. 11 (for clarity) but used by the grammar model are the variables "idn" and "dn", representing an identified day number and an unknown day number, respectively, and the variables "iy" and "y" representing an identified year number and an unknown year number, respectively, "fdn" and "fy" are the outputs of the llike function applied to a day number and year number, respectively.

Considering the example "Dcember 21, 1985" mentioned above, the grammar model illustrated in FIG. 11 first identifies an unknown month "m" (Dcember). The model then recognizes a day number (21) followed by a comma (,) and a year number (1985). The llike function is then applied to the unknown month leading to the result that the unknown month is similar to the month "December". Since the day number and year number have been identified, the llike function simply yields the identified sequence and the state changes to the next state. Since no day name has been identified as known (id) or unknown (d), the respective application of llike to "id" and "d", that are both empty" returns a "true" and the state changes to the next state as well. Applying the external function "datedelaformat" (used to output the extracted date in a specific predefined format) then yields "Dec. 21, 1985. Date+Day=21+Month=12+Year=1985".

Figure 12:
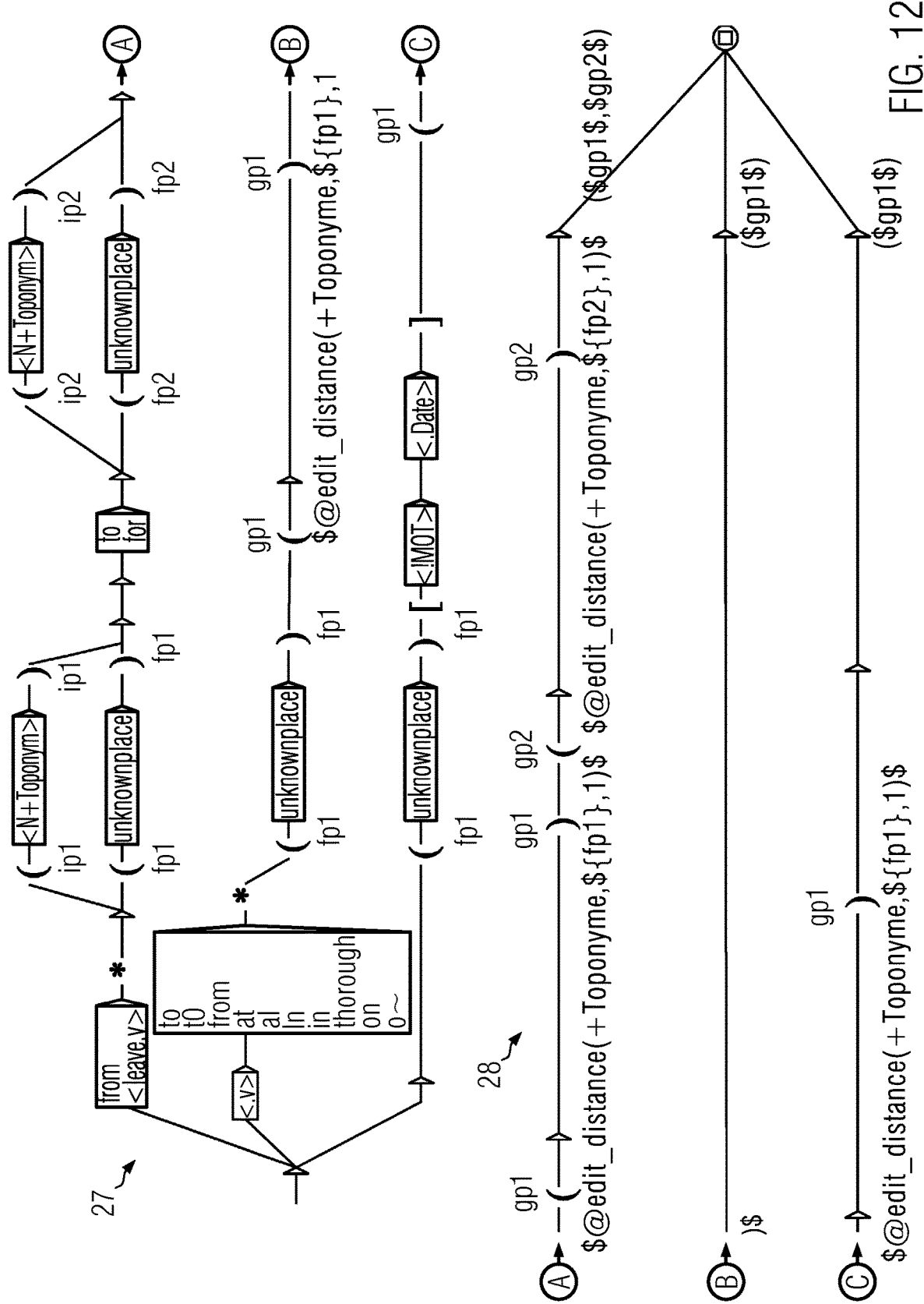
FIG. 12 illustrates a further exemplary application of a grammar model according to the present disclosure.

FIG. 12 shows another example that should illustrate the possible use of a grammar model according to the present disclosure. In view of the size of the graph, it has been split into two parts that are actually connected. The upper part 27 ends in connecting points A, B, and C, which continue in the lower part 28. Note that the connecting points A, B, and C are not part of the actual graph but are only intended to illustrate how the parts of the graph are interconnected.

The grammar model of this example may be used for named entity extraction, particularly for identifying geographic locations. To render the named entity extraction fault-tolerant, the external function "edit_distance" is used, which tests if a string, in a context related to geographic entities as modelled by the grammar model, has an edit distance lower than a threshold from another string belonging, for instance, to an electronic linguistic dictionary. The function named edit_distance receives 3 parameters, (1) a literal indicating the type of dictionary entries to test, (2) the sequence to compare against dictionary entries and (3) the maximal allowed edit distance. Three possible main paths could be considered to describe some geographical expressions: (A) The upper path (connected via connecting point A) which recognizes expressions starting by "from" or by any conjugated form of the verb "to leave" (by convention noted as <leave.V>) and immediately followed by a first known (variable ip1) or unknown place name (variable fp1) connected to a second know (variable ip2) or unknown place name (variable fp2) by the prepositions "to" or "for". (B) The middle path (connected via connecting point B) which recognizes expressions starting by a verb (noted as <.V>) following by a proposition and an unknown place name (variable fp1). (C) The bottom path (connected via connecting point C) which recognizes expressions starting with an unknown place name (variable fp1) and followed by a date expression (noted as <.Date>) which is found by the application of the graph shown at the FIG. 11. Path (A) allows identifying expressions like "from Pris to Bordaux" but not like "leaving Home to studi". Path (B) allows identifying expressions like "passing through Kygyzstan" but not like "passing through team". Finally, path (C) allows identifying expressions like "L0ndon, 10th Setember 2014" but not like "Newsletter, 12th Noember 2013".

In the graph of FIG. 12, more particularly, the variables "ip1/2" refer to an identified place, "fp1/2" refer to an unknown place. The variables "gp1/2" refer to the result of the edit distance function applied to an unknown place.

Considering the example "from Pris to Bordaux" mentioned above, the grammar model illustrated in FIG. 12 first identifies the expression "from" followed by an unknown place "fp1". The model then recognizes "to" and a further unknown place "fp2". Applying the function "edit distance" to "fp1" and "fp2" yields "gp1" and "gp2," respectively, corresponding to the return values of the "edit_distance" function corresponding to the entry of the dictionary being similar to "fp1" and "fp2". In this example, "gp1" and "gp2" correspond to "Paris" and "Bordeaux", respectively.

Figure 13:
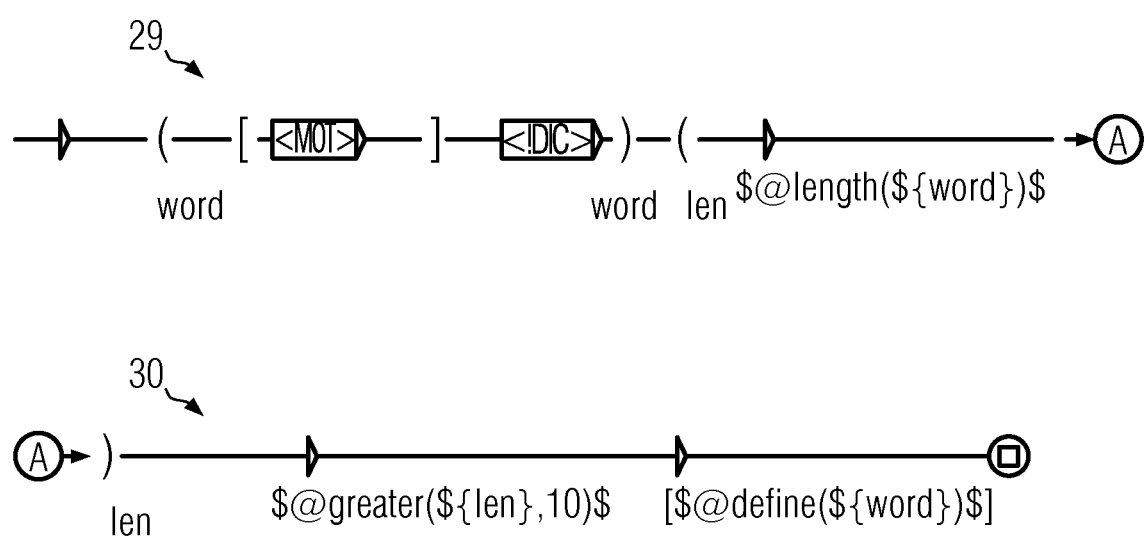
FIG. 13 illustrates another exemplary application of a grammar model according to the present disclosure.

FIG. 13 shows another example of an application of the local grammar model according to the present disclosure. In view of the size of the graph, it has been split into two parts that are actually connected. The upper part 29 ends in connecting point A, which continues in the lower part 30. Note that the connecting point A is not part of the actual graph but is only intended to illustrate how the parts of the graph are interconnected.

In this example, an arbitrary word (noted as <MOT>) that is unknown, i.e., not found in an electronic linguistic dictionary (noted as <!DIC>), is identified and saved in a variable named word. An external function "length" is then used to calculate the length of the unknown word, for that the external function returns a numeric value that will be stored on the variable "len". A second external function "greater" is used to test whether the length of the unknown word is larger than a literal value of 10. Finally, a last external function, which receives the unknown word and returns its definition, is used. In this case the extended function can use, for example, a resource, method or service via a communication network, to look-up for the definition of a word. The resulting graph of the FIG. 13 can later be used as part of a more complex graph to identify unknown words as part of a named-entity recognition task.

Figure 14:
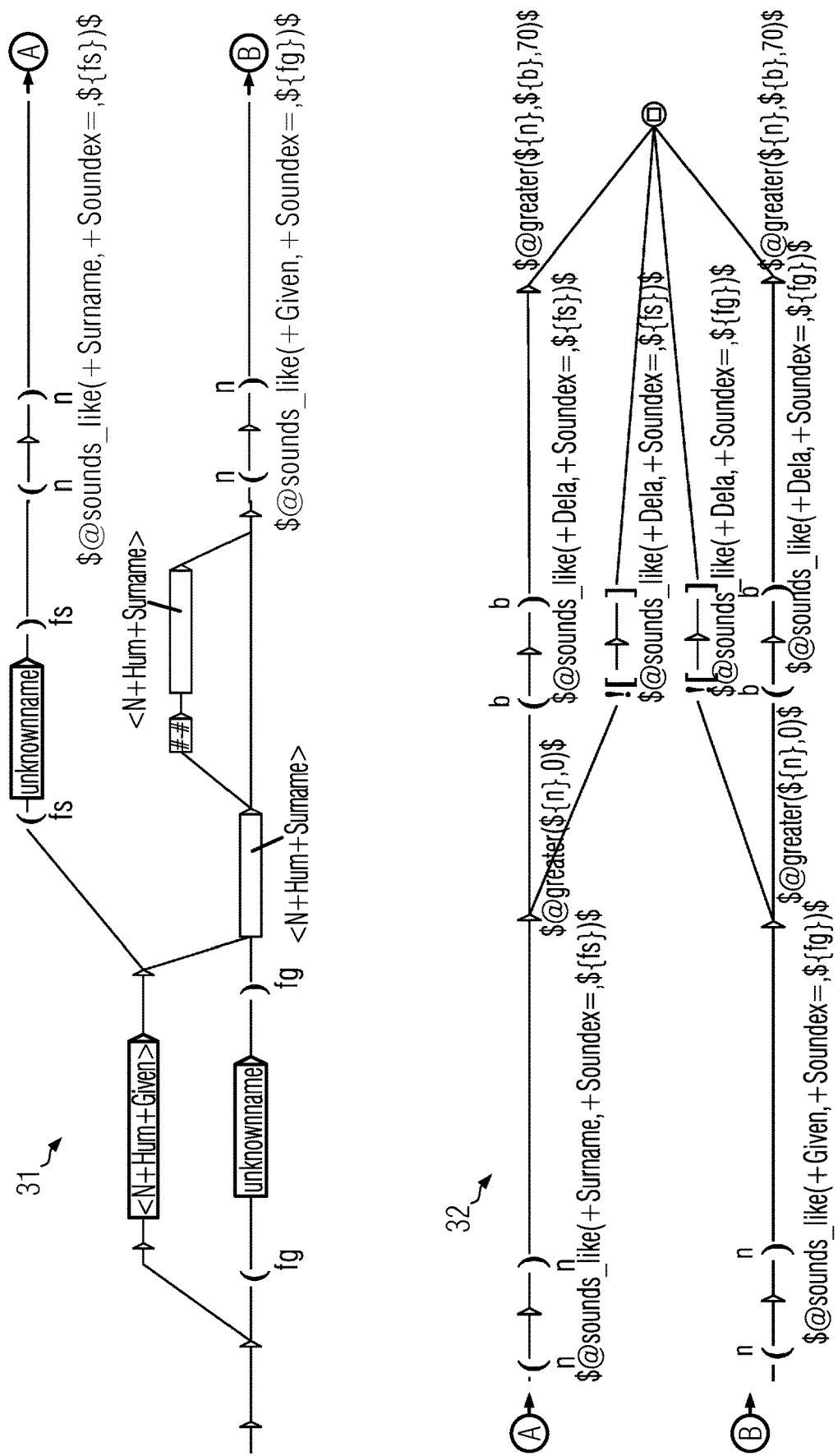
FIG. 14 illustrates another exemplary application of a grammar model according to the present disclosure.

FIG. 14 shows another example that should illustrate the possible use of a grammar model according to the present disclosure. In view of the size of the graph, it has been split into two parts that are actually connected. The upper part 31 ends in connecting points A and B, which continue in the lower part 32. Note that the connecting points A and B are not part of the actual graph but are only intended to illustrate how the parts of the graph are interconnected.

The grammar model of this example may be used for named entity extraction, particularly for recognizing whether an input text comprises person-names. It may recognize a known given name followed by an unknown family name or vice versa. The example uses the external function "sounds_like" that uses a Key Collision Method, specifically a phonetic distance between words as similarity measure. The known phonetic algorithm "Soundex" may be used. The sounds_like function accepts 3 input parameters, the first input parameter indicates the semantic attribute to filter the dictionary entries that will be used to perform the comparison: +Given: compare against all the dictionary entries marked as given names, +Surnames: compare against all the dictionary entries marked as surnames or, +Dela: compare against all other entries not belonging to the two previous categories; the second parameter is the attribute of the dictionary entries, in the form +Soundex=key, which includes the precalculated Sounded keys to be compared; finally, the third parameter is the string to be compared in a way to satisfy the relationship soundex(third parameter) equal to a key belonging to any +Soundex=key entry.

Consider, for instance, the input text "Alexandrs Duval". The phonetic key of the string "Alexandrs" (unknown name "fg" before identified surname "Duval") may be A425. In an electronic linguistic dictionary 643 entries (variable "n") may be found with the same phonetic key and corresponding to a given name "+Given" (e.g., "Aleksandra,.N+Human+Given+Soundex=A425"). 42 entries (variable "b") may be found with the same key but not relating to a person name "+Dela" (e.g., "aleukaemic,.A+Dela+Soundex=A425"). The external function "greater" then determines whether the difference between the two values (643 and 42) is greater than a predetermined threshold (in this example 70). Since this is the case, the input text "Alexandrs Duval" is identified as relating to a personal name.

In the graph of FIG. 14, more particularly, the variables "fs" and "fg" refer to an unknown name, "n" and "b" refer to the outputs of the sounds_like function applied to an unknown name.

Figure 15:
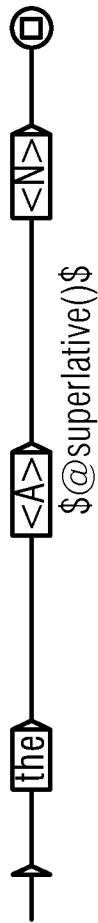
FIG. 15 illustrates another exemplary application of a grammar model according to the present disclosure.

FIG. 15 shows another graph of an exemplary extended local grammar model according to the present disclosure. This example shall illustrate different ways to build outputs. Given the extended local grammar illustrated in FIG. 15, including the call to a function named superlative, which given an adjective (located at the current input label and directly accessed from the function) returns its superlative, and the input sequence "The crazy things", the outputs can be:

| Short name | Description | Output |
|---|---|---|
| A) ignored | The result of concatenating the input labels belonging to each of the stored successful paths (i.e., ignoring output labels) | The crazy things |
| B) merged | The concatenation result of merging the input labels, with the output labels belonging to each of the stored successful paths (i.e., merging input and output labels) | The craziest crazy things |
| C) replaced | The concatenation result of replacing the input labels with the output labels belonging to each of the stored successful paths (i.e., replacing input labels with output labels) | The craziest |
| D) updated | The concatenation result of updating the input labels with the non-empty output labels belonging to each of the stored successful paths (i.e., replacing input labels with non-empty output labels) | The craziest things |

In FIG. 15, <A> refers to an adjective and <N> to a noun.

Figure 16:
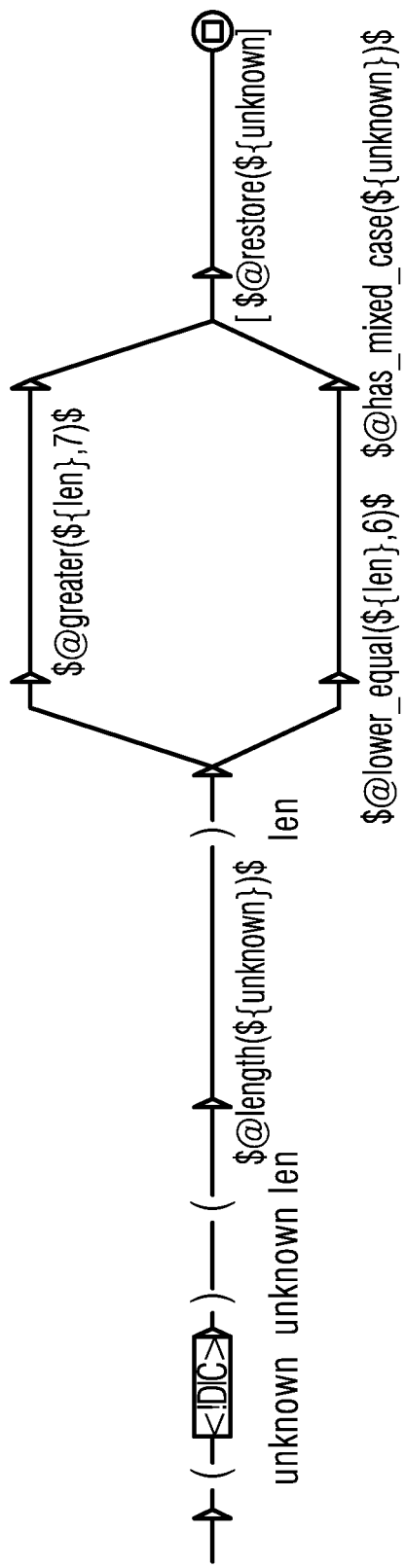
FIG. 16 illustrates another exemplary application of a grammar model according to the present disclosure.

A final example for an extended local grammar model according to the present disclosure is illustrated in FIG. 16. This example may be used for textual restoration. Consider the following input text, wherein some terms miss the required blanks in between and are, thus, wrongly written as one word:

"Text categorization is afundamentaltask in documentprocessing, allowingthe automatedhandlingof enormousstreams of documents in electronic form"

The method of the present disclosure can produce with the graph illustrated in FIG. 16 the following reformattedoutput:

"Text categorization is a fundamental task in document processing, allowing the automated handling of enormous streams of documents in electronic form".

In more detail, an unknown word (e.g., afundamentaltask) is first stored on the variable "unknown", an extended function named "length" will return the length of the unknown word and the result will be stored on the variable "len", two exploration paths are then considered: (A) the length of the unknown word is greater than 7 (thus more likely to be a set of words wrongly written as one word) or (B) the length of the unknown word is lower or equal than 6 and furthermore has a mixed case (e.g., aHotel). If one of the previous conditions is fulfilled, the unknown word is passed to a function named "restore" that will return the best split of it in terms of know words (e.g., given afundamentaltask it returns a fundamental task). The "restore" function is implemented using known backtracking techniques to, given a sequence of characters, a list of entries belonging to a dictionary, and a function that weighs each word according to its category and position; finding the best sequence of known words that split the unknown input.

Figure 17:
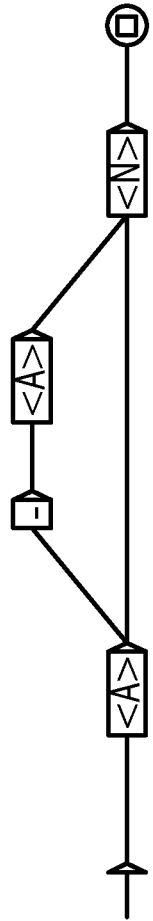
FIG. 17 shows an exemplary grammar model to illustrate the possibility of more than one successful paths.

FIG. 17 illustrates an example of how a given natural language input can lead to more than one successful path in a given grammar model according to the present disclosure. The grammar model, as illustrated in FIG. 17, is able to recognize (1) an adjective followed by a noun or (2) a compound adjective followed by a noun. Given the input sequence "the acid-base reaction forms water and salt", starting from the initial state and leading to the final state of the grammar model, the input sequence could be recognized by the path (i) <A> followed by—; <A>; <N> (acid-base reaction), here <A> stands for an adjective and <N> for a noun; or by (ii) <A> followed by <N> (base reaction). Therefore, the length of successful paths could be lower or higher producing shorter or longer recognized sequences. In the example, the successful paths (i) and (ii) recognize, respectively, the sequences "acid-base reaction" (the longest one) and "base reaction" (the shortest one).

Although previously discussed embodiments and examples of the present disclosure have been described separately, it is to be understood that some or all of the above-described features can also be combined in different ways. The discussed embodiments are not

The invention claimed is:

1. A computer-implemented method for automatically analyzing a natural language input for fault-tolerant named-entity recognition, the method comprising:
  (i) a step of receiving the natural language input;
  (ii) a step of providing a grammar model, the grammar model being represented as an augmented transition network with outputs and comprising:
    a local grammar model used for modelling a syntactic and semantic structure of at least a part of the natural language input, with a finite set of state transitions between states, the state transitions being defined by: a current state, a following state, an input label and an output label;
    a set of external functions for information extraction, linked to the local grammar model, wherein one or more of the external functions are attached to the state transitions, each external function being external in the sense that each external function is not part of the local grammar model and allows the grammar model to be fault-tolerant against morphology, syntax, semantic and/or discursive issues present in the natural language input;
    a finite set of read/write memory registers used by a finite state machine or a finite state transducer to parse expressions and by the one or more external functions, in which are stored the natural language input, the states, the outputs of the grammar model, and/or other data; and
    each of the one or more external functions being an operation over: at least the part of the natural language input, one or more states, the outputs of the grammar model already stored on the memory registers, and/or other data;
  (iii) a step of applying the grammar model to at least a part of the natural language input using the finite state machine or the finite state transducer, comprising:
    a call of the one or more external functions by the finite state machine or the finite state transducer, evaluating the external functions with a register-based virtual machine; and
    the grammar model changing from the current state to the following state whenever the condition is fulfilled that the one or more external functions attached to a state transition returns a return value, which is a non-empty string, a number or a boolean value equal to true;

(iv) a step of extracting information from the at least part of the natural language input using at least an output of the grammar model being built based on:
  at least one return value of the one or more external functions from evaluating the one or more external functions in step (iii), wherein the at least one return value has been stored in a memory register; and
  one or more input labels and/or output labels;
the grammar model being able to:
  access information from the memory registers and/or from an external computer-implemented resource, method or service, to generate the outputs; and
  identify and classify named entities in the natural language input into predetermined categories.

2. The computer-implemented method according to claim 1, wherein the grammar model is described as a 7-tuple G=(Q, Σ, Γ, I, F, E, s) over Φ a set of external functions f, and wherein:
  Q is a finite set of states;
  Σ is an input alphabet comprising a finite set of symbols;
  Γ is an output alphabet comprising a finite set of symbols;
  I is a set of sub-graphs;
  F☐Q is a set of accepting states, wherein F≠∅;
  E☐Q×(Σ ∪ {☐})×(Γ ∪ {ϵ})×(Γ ∪ {ϵ})×Q is a finite set of state transitions; and
  s ☐ Q is a unique initial state;
  Each state transition t=(p[t], li[t], lo[t], n[t])☐ E is a transition from a current state p to a following state n, with an input label li[t], an external function f[t], and an output label lo[t].

3. The computer-implemented method according to claim 1, wherein at least one of the external functions receives a parameter, or a set of parameters, as input parameters; and the set of input parameters of the one or more external functions include references to:
  literal values comprising strings, numbers, or booleans; and/or
  input/output variables stored in the read/write memory registers.

4. The computer-implemented method according to claim 1, wherein the method is used for fault-tolerant information extraction, by tolerating morphology, syntax, semantic, or discursive issues present in the natural language input, the one or more external functions allowing to take into account document knowledge as well as out-of-document knowledge.

5. The computer-implemented method according to claim 1, wherein each of the one or more external functions is a logical, string and/or mathematical operation over: its input parameters, at least a part of the natural language input, one or more states, the grammar model's outputs, and/or other data stored on the read/write memory registers.

6. The computer-implemented method according to claim 1, wherein one of the external functions yields a measure for text similarity between an input variable and a predetermined reference element.

7. The computer-implemented method according to claim 6, wherein the predetermined reference element is taken from a set of read/write memory registers and/or from a set of electronic linguistic dictionaries, which comprise at least a lexical entry associated with a set of canonical, grammatical, syntactic-semantic and/or inflectional attributes.

8. The computer-implemented method according to claim 1, wherein at least one of the external functions calls an external computer-implemented resource, method or service via a network and wherein the external computer-implemented resource, method or service operates or returns information over function input parameters, the natural language input, one or more states, the grammar model's outputs, and/or over a set of read/write memory registers.

9. The computer-implemented method according to claim 1, wherein the one or more external functions are functions relating to primitive string operations, string similarity operations, an interface to external resources or methods, and/or relating to processing of tokens, lists, numbers and/or matches.

10. The computer-implemented method according to claim 1, wherein evaluating the external functions comprises:
  calling an external computer-implemented resource, method or service using a set of literals and/or a set of parameters from function input values, the natural language input, one or more states and/or from a set of read/write memory registers;
  receiving a response from the computer-implemented resource or service; and
  storing the response in a memory location.

11. The computer-implemented method according to claim 1, wherein if applying the grammar model led to an accepting state of the grammar model, further comprising:
  (i) indexing:
    a shortest successful path;
    a longest successful path; or
    all successful paths;
  (ii) building stored outputs by concatenating:
    input labels belonging to stored successful paths; or
    a result of merging input labels with output labels belonging to stored successful paths; or
    a result of replacing input labels with output labels belonging to stored successful paths; or
    a result of updating input labels with non-empty output labels belonging to stored successful paths; and
  (iii) outputting:
    a subset of the stored outputs; or
    all the stored outputs.

12. The computer-implemented method according to claim 1, further comprising modifying a following state and/or the output label of the state transitions based on evaluation of the external functions.

13. The computer-implemented method according to claim 1, after receiving the natural language input and prior to applying the grammar model further comprising:
  a) identifying a main language of the natural language input;
  b) segmenting the natural language input into text blocks;
  c) splitting the text blocks into lexical units;
  d) searching on a set of electronic linguistic dictionaries for entries matching one or more of the lexical units; and
  e) assigning a lemma, a grammatical category, syntactic-semantic attributes, and/or inflectional information to one or more of the lexical units.

14. The computer-implemented method according to claim 1, wherein the method is used for performing sentiment analysis in product reviews, developing chatbot environments, creating services to enhance and integrate customer data, improving machine translation systems, designing knowledge extraction tools for decision-supporting, or anonymizing sensitive information.

15. A computer system for fault-tolerant information extraction, comprising:
  a processor; and
  a non-transitory computer-readable medium storing instructions that, when executed by the processor, cause the computer system to carry out a method for automatically analyzing a natural language input for fault-tolerant named-entity recognition, the method including:

(i) a step of receiving the natural language input;
(ii) a step of providing a grammar model, the grammar model being represented as an augmented transition network with outputs and comprising:
- a local grammar model used for modelling a syntactic and semantic structure of at least a part of the natural language input, with a finite set of state transitions between states, the state transitions being defined by: a current state, a following state, an input label and an output label;
- a set of external functions for information extraction, linked to the local grammar model, wherein one or more of the external functions are attached to the state transitions, each external function being external in the sense that each external function is not part of the local grammar model and allows the grammar model to be fault-tolerant against morphology, syntax, semantic and/or discursive issues present in the natural language input;
- a finite set of read/write memory registers used by a finite state machine or a finite state transducer to parse expressions and by the one or more external functions, in which are stored the natural language input, the states, the outputs of the grammar model, and/or other data; and
- each of the one or more external functions being an operation over: at least the part of the natural language input, one or more states, the outputs of the grammar model already stored on the memory registers, and/or other data;

(iii) a step of applying the grammar model to at least a part of the natural language input using the finite state machine or the finite state transducer, comprising:
- a call of the one or more external functions by the finite state machine or the finite state transducer, evaluating the external functions with a register-based virtual machine; and
- the grammar model changing from the current state to the following state whenever a condition is fulfilled that the one or more external functions attached to a state transition returns a return value, which is a non-empty string, a number or a boolean value equal to true;

(iv) a step of extracting information from the at least part of the natural language input using at least an output of the grammar model being built based on:
- at least one return value of the one or more external functions from evaluating the one or more external functions in step (iii), wherein the at least one return value has been stored in a memory register; and
- one or more input labels and/or output labels;

the grammar model being able to:
- access information from the memory registers and/or from an external computer-implemented resource, method or service, to generate the outputs; and
- identify and classify named entities in the natural language input into predetermined categories.

* * * * *